United States Patent
Seo et al.

(10) Patent No.: US 10,430,091 B2
(45) Date of Patent: Oct. 1, 2019

(54) ELECTRONIC DEVICE AND METHOD FOR STORING SECURITY INFORMATION THEREOF

(71) Applicant: Samsung Electronics Co., Ltd., Suwon-si, Gyeonggi-do (KR)

(72) Inventors: Won Suk Seo, Suwon-si (KR); Sung Whan Moon, Seoul (KR); Chang Wook Lee, Hwaseong-si (KR); Sung Oh Hwang, Yongin-si (KR); Singh Bhupinder, Mountain View, CA (US); Chongyang Xie, Mountain View, CA (US); Geng Chen, San Jose, CA (US); Muralidhar Kattimani, Sunnyvale, CA (US); Naman Patel, Fremont, CA (US); Sambit Kumar Shukla, Union City, CA (US); Sia Jeffry Saputra, Sunnyvale, CA (US); Victor Havin, Foster City, CA (US); Sung Gyu Kim, Yongin-si (KR); Min Woo Park, Namyangju-si (KR); Jae Hoon Ryu, Seoul (KR); Seung Hoon Lee, Yongin-si (KR); Dong Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 15/227,335

(22) Filed: Aug. 3, 2016

(65) Prior Publication Data
US 2017/0038989 A1    Feb. 9, 2017

(30) Foreign Application Priority Data

Aug. 7, 2015 (KR) .................. 10-2015-0111565

(51) Int. Cl.
G06F 3/06 (2006.01)
G06F 21/62 (2013.01)
G06F 21/64 (2013.01)

(52) U.S. Cl.
CPC .......... G06F 3/0623 (2013.01); G06F 3/0659 (2013.01); G06F 3/0683 (2013.01); G06F 21/6218 (2013.01); G06F 21/645 (2013.01)

(58) Field of Classification Search
CPC .. G06F 21/6218; G06F 3/0623; G06F 3/0659; G06F 3/0683; G06F 21/645
(Continued)

(56) References Cited

U.S. PATENT DOCUMENTS 8,539,602 B2   9/2013 Chowdhury et al.
8,561,204 B1 * 10/2013 Dalcher .................. G06F 21/60
                                                                  726/27
(Continued)

Primary Examiner — Kambiz Zand
Assistant Examiner — Benjamin A Kaplan
(74) Attorney, Agent, or Firm — Jefferson IP Law, LLP

(57) ABSTRACT

An apparatus and method for storing security information are provided. The apparatus is generally an electronic device that includes a memory configured to include a secured region to store security information and a processor configured to electrically connect with the memory. The processor is further configured to execute an application program configured to store the security information in a first secured region, to receive a request to store the security information from the application program, and to store the security information in a second secured region different from the first secured region in response to the request.

20 Claims, 17 Drawing Sheets

(58) Field of Classification Search
USPC ............................................................ 726/1
See application file for complete search history.

(56) References Cited

U.S. PATENT DOCUMENTS

| | | |
|---|---|---|
| 8,713,667 B2 | 4/2014 | Kalibjian et al. |
| 8,959,579 B2 | 2/2015 | Barton et al. |
| 9,298,910 B2 * | 3/2016 | Dalcher .................. G06F 21/53 |
| 9,530,011 B2 * | 12/2016 | French .................. G06F 21/602 |
| 2007/0011736 A1 | 1/2007 | Kalibjian et al. |
| 2007/0162699 A1 | 7/2007 | Sohn et al. |
| 2011/0277013 A1 | 11/2011 | Chinta |
| 2012/0331560 A1 | 12/2012 | Chowdhury et al. |
| 2014/0108793 A1 | 4/2014 | Barton et al. |
| 2014/0108794 A1 | 4/2014 | Barton et al. |
| 2014/0115660 A1 | 4/2014 | Chinta |
| 2015/0046979 A1 | 2/2015 | Wu et al. |
| 2015/0143070 A1 | 5/2015 | Lee et al. |
| 2015/0143120 A1 | 5/2015 | Barton et al. |
| 2015/0154417 A1 | 6/2015 | Pasumarthi et al. |
| 2018/0173856 A1 * | 6/2018 | Ahmed .................. G06F 21/10 |

* cited by examiner

FIG. 6A

Unified Credential Settings

50 — Credential Service Providers
60 — Trusted Credentials

FIG. 6B

Credential Service Provider com.samsung.cred.software.bc com.samsung.baimobile.kox.agent

FIG. 6C

Credential Service Provider Info

Name
 com.samsung.cred.software.bc

Description
 BouncyCastle Backes Credential Storage

Manufacturer
 Samsung Electronic. Inc

Attached
 True

Hardware Backed
 False

Require User Verification
 True

Settings

FIG. 6D

Trusted Credentials alias1
com.samsung.cred.software.bc

94c2515ec1959219adea5eb6751651051cb3b00a
com.samsung.cred.software.bc

My Key Chain
com.samsung.bainmobile.knox.agent

FIG. 6E

Trusted Credentials alias1
com.samsung.cred.software.bc
Certificate:
  Data:
    Version:3(0x2)
    Serial Number:9587876556:8747789
(0x8315ffee39c85d8d)
    Signature Algorithm:sha1WithRSAEncryption
    Issuer:C=US,ST=California,L=Mountain View,
O=My Company,OU=My unit, CN=localhost
    Validity
      Not Before:Mar 27 08:30:25 2012 GMT
      Not After:Mar 27 08:30:25 2022 GMT
    Subject:C=US,ST=California,L=Mountain View
O=My Company,OU=My unit, CN=localhost
    Subject Public Key Info:
      Public Key Algorithm: rsaEncryption
        Public Key:(2048 bit)
        Modulus:
          00:b1:04:3c:2f:09:90:6e:d0:2b
63:b7:d8:3a:73:

19:68:95:6b:d1:ea:c1:50:a6:a2:88:8:60:76:04:
          bd:9b:a8:b3:25:fd:ac:7e:

OK

ELECTRONIC DEVICE AND METHOD FOR STORING SECURITY INFORMATION THEREOF

CROSS-REFERENCE TO RELATED APPLICATION(S)

This application claims the benefit under 35 U.S.C. § 119(a) of a Korean patent application filed on Aug. 7, 2015 in the Korean Intellectual Property Office and assigned Serial number 10-2015-0111565, the entire disclosure of which is hereby incorporated by reference.

TECHNICAL FIELD

The present disclosure relates to storing security information needed to be securely stored in an electronic device.

BACKGROUND

With the development of electronic technologies, various types of electronic products have been developed and spread. Particularly, recently, electronic devices, such as smartphones and table personal computers (PCs), with a variety of functions have come into wide use.

As electronic devices provide various functions, privacy protection or security information management has become more and more important. Therefore, each of electronic devices has a separate storage space for storing security information such as a certificate to strengthen security.

Each of the electronic devices may include a plurality of memories (or chips) for storing security information. Each of the electronic devices should manage a variety of service agents (or $3^{rd}$ party plug-in), each of which accesses each memory, to access a plurality of memories and to store and read security information. Also, there may be a plurality of application programming interfaces (APIs) for accessing service agents based on a type of an application which requests to store security information.

Since there are a plurality of service agents and APIs, it is difficult to develop and manage a new service. If a new service agent is added or if a function is changed, a code should be repeatedly corrected for each service agent.

Also, if there are various memories in an electronic device upon storing security information, the security information is uniformly stored in a specific memory based on a code written when an application is developed. Therefore, the electronic device does not correspond to a situation or a function change, which may occur later, efficiently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for efficiently developing and managing a function of storing security information by managing functions associated with storing the security information in an integrated way and a method for storing the security information thereof.

Accordingly, another aspect of the present disclosure is to provide an electronic for managing security information in a fluid way based on its situation and a method for storing the security information thereof.

In accordance with an aspect of the present disclosure, an electronic device is provided. The electronic device may include at least one memory configured to include a first secured region and a second secured region different from the first secured region and a processor configured to electronically connect with the at least one memory. The at least one memory may store instructions, when executed, for instructing the processor to execute an application program configured to store data in the first secured region, to receive an input for storing the data, through the application program, and to store the data in the second secured region rather than the first secured region in response the input.

In accordance with another aspect of the present disclosure, an electronic device is provided. The electronic device may include at least one memory configured to include a secured region to store security information and a processor configured to electrically connect with the at least one memory. The processor may be configured to execute an application program configured to store the security information in a first secured region, to receive a request to store the security information from the application program, and to store the security information in a second secured region different from the first secured region in response to the request.

In accordance with another aspect of the present disclosure, a method for storing security information in an electronic device is provided. The method may include executing an application program configured to store security information in a first secured region, receiving a request to store the security information from the application program, and storing the security information in a second secured region in response to the request.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 6D, and 6E are drawings illustrating a user interface displayed on a display according to various embodiments of the present disclosure;

Throughout the drawings, it should be noted that like reference numbers are used to depict the same or similar elements, features, and structures.

DETAILED DESCRIPTION

Figure 1:
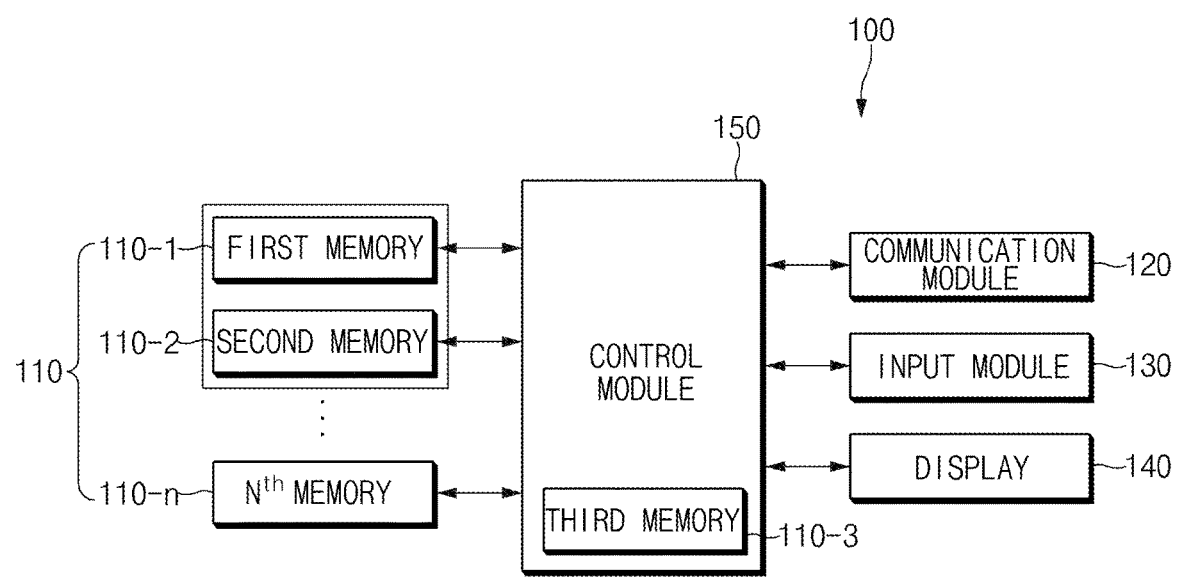
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is/are no intervening element(s) (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs which stores a dedicated processor (e.g., an embedded processor) for performing a corresponding operation.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device according to various embodiments of the present disclosure.

Referring to FIG. 1, an electronic device 100 may include a memory 110, a communication module 120, an input module 130, a display 140, and a control module 150.

According to an embodiment, the memory 110 may include a plurality of memories 110-1 to 110-n. Each of the plurality of memories 110-1 to 110-n may store security information in a secured region according to various embodiments of the present disclosure. The security information may include a variety of information, for example, a certificate, an authentication key, a password, payment information, and the like, necessary for security to be prevented from flowing to others. The secured region may be, for example, a region which stores security information among storage regions of the memory 110.

According to an embodiment, the secured region may be all or part of one memory.

According to an embodiment, the plurality of memories 110-1 to 110-n may be different types of storage media. The plurality of memories 110-1 to 110-n may include, for example, a secure element (SE) card, a subscriber identity module (SIM) card, a secure digital (SD) card, an advanced security secure digital (ASSD) card, a command access (CA) card, a trustzone, an embedded flash memory, and the like.

According to an embodiment, some (e.g., the first memory 110-1 and the second memory 110-2) of the plurality of memories 110-1 to 110-n may be physically included in one memory. For example, each of the first memory 110-1 and the second memory 110-2 may refer to a separate memory area operatively divided in one memory.

According to an embodiment, some of the plurality of memories 110-1 to 110-n may be implemented in the form of being removable from the electronic device 100. For example, the SIM card and the SD card may be implemented in the form of being removable from a slot formed in the electronic device 100.

In FIG. 1, an embodiment is exemplified as the plurality of memories 110-1 to 110-n are independent of the control module 150. However, embodiments of the present disclosure are not limited thereto. For example, some (e.g., the third memory 110-3) of the plurality of memories 110-1 to 110-n may be included in the control module 150. The third memory 110-3 may be, for example, a memory included in the control module 150 and may store security information in a memory area (e.g., a trustzone) accessible by the control module 150 when the control module 150 operates in a security mode. A description will be given below of this with reference to FIG. 2.

The communication module 120 may communicate with an external device. According to an embodiment, the communication module 120 may receive a security information management policy from an external server. According to an embodiment, the communication module 120 may receive a security level of the memory 110 from the external server. For example, the communication module 120 may send information about the plurality of memories 110-1 to 110-n included in the electronic device 100 to the external server and may receive the security level of the memory 110 from the external server. If the electronic device 100 uses a mobile device management (MDM) service, the external server may be, for example, the MDM server.

According to an embodiment, the communication module 120 may communicate data over a network (e.g., a mobile communication network or an internet network). According to an embodiment, the communication module 120 may include a cellular module, a Wi-Fi module, a Bluetooth (BT) module, a near field communication (NFC) module, a GNSS module, and the like.

The input module 130 may receive a user command According to an embodiment, the input module 130 may include a touch sensor panel for sensing a touch operation of a user of the electronic device 100 or a pen sensor panel for sensing a pen operation of the user. According to an embodiment, the input module 130 may detect a user operation, input within a specific distance, which is not in direct contact with a panel (e.g., the touch sensor panel or the pen sensor panel) as well as being in direct contact with the panel.

The display 140 may display a user interface. According to an embodiment, the display 140 may display memory management information. For one example, the display 140 may display a list of memories which may store security information among the plurality of memories 110-1 to 110-n. For another example, the display 140 may display a list of security information stored in the plurality of memories 110-1 to 110-n.

According to an embodiment, the input module 130 and the display 140 may be implemented with, for example, a touch screen, in which a touch sensor panel is disposed on a display panel, which may simultaneously perform a display operation and a touch sensing operation The control module 150 may control an overall operation of the electronic device 100. According to an embodiment, the control module 150 may control the memory 110, the communication module 120, the input module 130, and the display 140 to store security information in the memory 110 and to read the stored security information according to various embodiments of the present disclosure.

According to an embodiment, the control module 150 (or a processor) (e.g., an AP) may be implemented with a system on chip (SoC) including a CPU, a graphic processing unit (GPU), a video processor, a memory, and the like.

According to an embodiment, if a request to store security information is received from an application, the control module 150 may store the security information in one of the plurality of memories 110-1 to 110-n. According to an embodiment, the control module 150 may read security information stored in the plurality of memories 110-1 to 110-n based on a request of the application.

Figure 2:
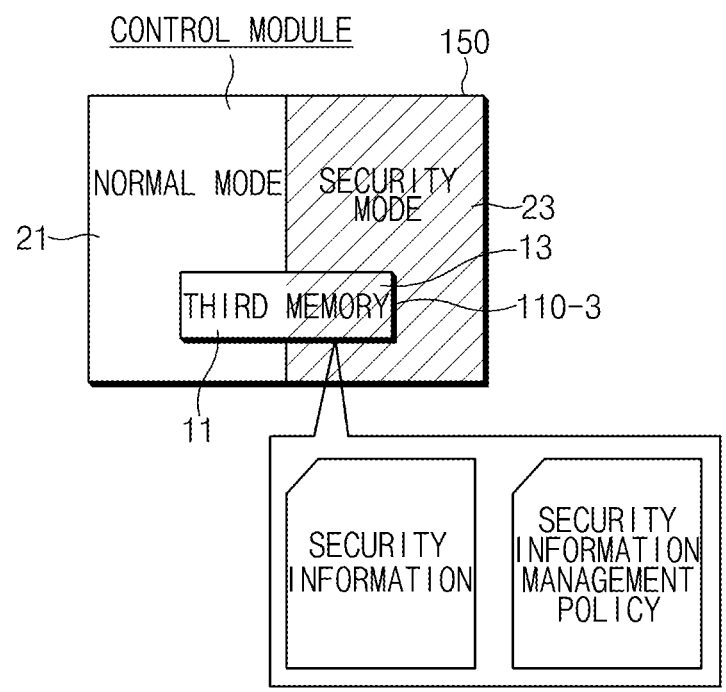
FIG. 2 is a drawing illustrating an operation mode of a control module according to various embodiments of the present disclosure.

FIG. 2 is a drawing illustrating an operation mode of a control module according to various embodiments of the present disclosure.

Referring to FIG. 2, a control module 150 may operate a plurality of execution environments having a plurality of security levels to strengthen security. The plurality of execution environments may include, for example, a normal mode 21 (or a rich execution environment (REE)) and a security mode 23 (or a trusted execution environment (TEE)).

According to an embodiment, the control module 150 may include a memory (e.g., a third memory 110-3 of FIG. 1). According to an embodiment, the third memory 110-3 may include a memory area 11 accessible by the control module 150 when the control module 150 operates in the normal mode 21 and a memory area 13 accessible by the control module 150 when the control module 150 operates in the security mode 23. According to an embodiment, the control module 150 may store security information and a security information management policy in the memory area 13 accessible in the security mode 23.

Figure 3:
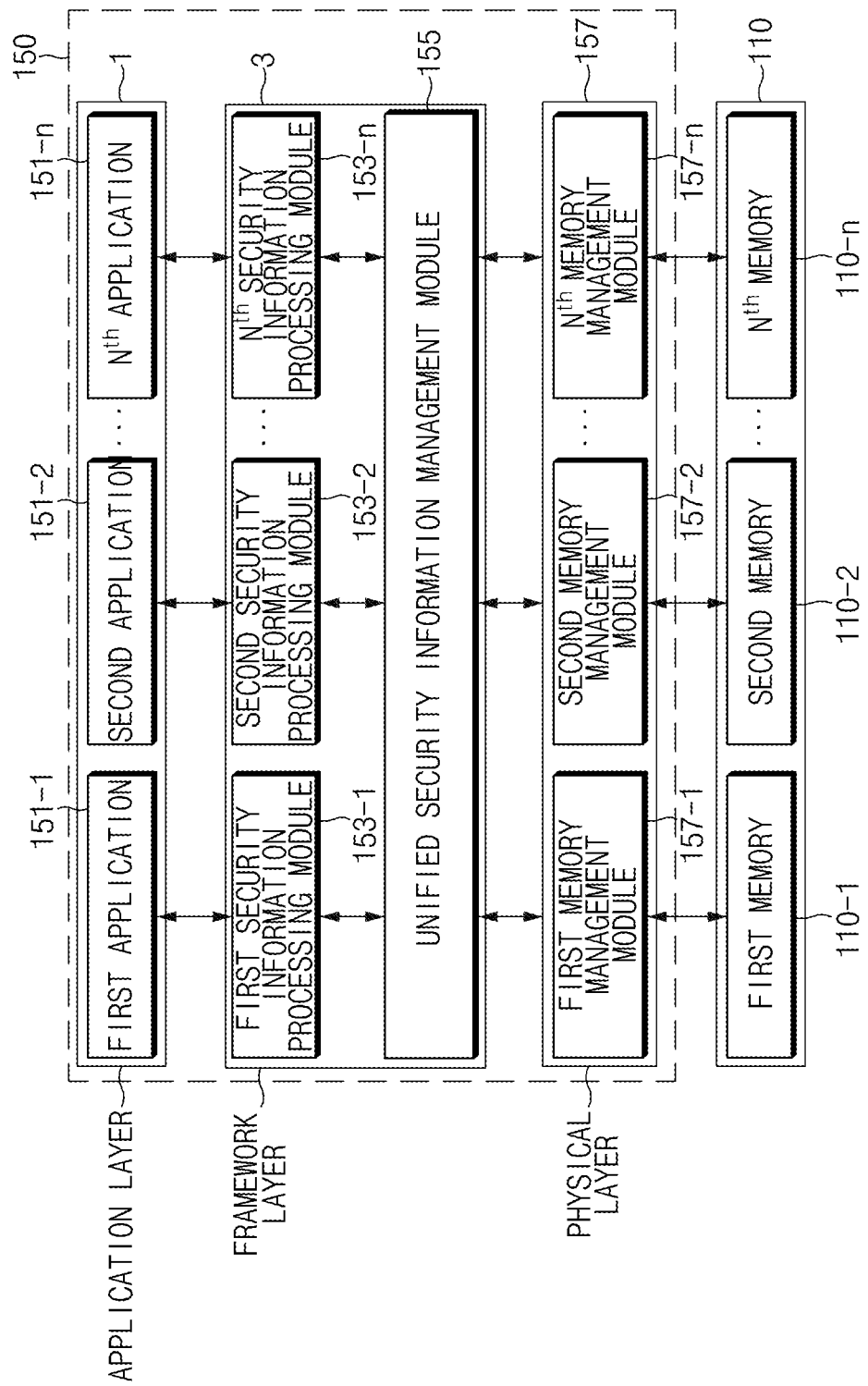
FIG. 3 is a block diagram illustrating a software hierarchical structure according to various embodiments of the present disclosure.

FIG. 3 is a block diagram illustrating a software hierarchical structure according to various embodiments of the present disclosure.

Referring to FIG. 3, a control module 150 may store security information in a memory 110 and may read the stored information from the memory 110 based on the software hierarchical structure shown in FIG. 3. Referring to FIG. 3, the software hierarchical structure may include an application layer 1 and a framework layer 3.

The application layer 1 may include a plurality of applications 151-1 to 151-n. The plurality of applications 151-1 to 151-n may be applications installed in an electronic device 100 of FIG. 1 and may include, for example, a user account management application, an e-mail application, a web browser, a financial application (e.g., a bank application, a stock application, and the like), a game application, and the like. If an event for storing security information is generated, each of the plurality of applications 151-1 to 151-n included in the application layer 1 may request the framework layer 3 to store the security information. According to an embodiment, each of the plurality of applications 151-1 to 151-n may request a specific memory (or a secured region) to store security information. For example, the plurality of applications 151-1 to 151-n may be programmed to store security information in a specific memory by an application developer. According to an embodiment, a service or module, driven in an operating system (OS) (or a kernel) or a framework, as well as the plurality of applications 151-1 to 151-n may request the framework layer 3 to store security information.

The framework layer 3 may include a plurality of security information processing modules 153-1 to 153-n and a unified security information management module 155. The plurality of security information processing modules 153-1 to 153-n may be different application programming interface (API) modules. The plurality of security information processing modules 153-1 to 153-n may include, for example, a java cryptography extension (JCE) API, a keychain API, an open secure socket layer (SSL) API, and the like.

According to an embodiment, each of the plurality of applications 151-1 to 151-n may select a security information processing module available to itself among the plurality of security information processing modules 153-1 to 153-n and may request the selected security information processing module to store security information. For one example, if an application is implemented with a java code, it may select a JCE API. If an application is implemented with a native code (e.g., C or C++), it may select an open SSL API. For another example, if an application wants to use a key store provided from Android, it may select a key chain API.

The unified security information management module 155 may process requests to store security information, received from the plurality of security information processing modules 153-1 to 153-n, in a unified way. According to various embodiments, security information may be stored and read through the unified security information management module 155. Although a new memory management module is added or although a function of a memory management module is changed, only the unified security information management module 155 may be changed without changing (or updating) the plurality of security information processing modules 153-1 to 153-n. Therefore, the changed unified security information management module may use the new memory management module or the changed function.

According to an embodiment, the unified security information management module 155 may manage memory management information. The memory management information may include, for example, a list of memories (or memory management modules) which may store security information among memories included in the electronic device 100, memory related information, a list of security information stored in the memories, a security level assigned to each of the memories, and the like.

According to an embodiment, the unified security information management module 155 may receive information, about a memory accessible by a memory management module 157, from the memory management module 157. For example, if the memory management module 157 is installed in the electronic device 100, the unified security information management module 155 may receive information about a memory accessible by the memory management module 157. The information about the memory may be included in, for example, metadata included in the memory management module 157. The information about the memory may include, for example, at least one of memory identification information, secured region identification information, information indicating whether the memory is removable, information indicating whether the memory is a hardwarily independent memory, or information about a manufacturer of the memory. The information about the memory may include other information other than the above-mentioned information.

According to an embodiment, the unified security information management module 155 may determine whether it is possible store security information using information received from the memory management module 157. According to an embodiment, if determining that it is possible to store the security information, the unified security information management module 155 may update memory management information. For example, the unified security information management module 155 may add a newly installed memory management module to the memory management information.

According to an embodiment, the unified security information management module 155 may determine a security level of a memory (or the memory management module 157 which is accessible to the memory) using information received from the memory management module 157. According to an embodiment, the unified security information management module 155 may set a removable memory (e.g., an SD card) to have a lower security level and may set a memory (e.g., an embedded secure element (eSE)) embedded in the electronic device 100 to have a higher security level. According to an embodiment, the unified security information management module 155 may set a hardwarily independent memory (e.g., an SE) to have a higher security level and may set a softwarily divided memory (e.g., part of an area of an embedded flash memory) to have a lower security level. According to an embodiment, the unified security information management module 155 may determine a security level of a memory based on a manufacturer of the memory. For example, the unified security information management module 155 may set a memory manufactured by a specific manufacturer (e.g., a manufacturer having high reliability) to have a higher security level and may set a memory manufactured by other manufacturers to have a lower security level. According to various embodiments, the unified security information management module 155 may set a security level of a memory in overall consideration of the above-mentioned method of determining the security level.

According to an embodiment, the unified security information management module 155 may determine a security level for a memory which may store security information. According to an embodiment, the unified security information management module 155 may relatively determine security levels for a plurality of memories 110-1 to 110-n of FIG. 1, or may assign absolute numeric values to the plurality of memories 110-1 to 110-n and may determine security levels for the plurality of memories 110-1 to 110-n.

According to an embodiment, if a specific event is generated, the unified security information management module 155 may determine a security level of a memory. For example, if memory management information is updated, the unified security information management module 155 may evaluate a security level of a memory included in a list again. According to an embodiment, the unified security information management module 155 may determine a security level of a memory at a specific period.

According to an embodiment, the security level of the memory may be received from an external server. For example, if the electronic device 100 uses an MDM service, it may send memory management information to an MDM server through a communication module 120 of FIG. 1 and may receive a security level of a memory from the MDM server.

According to an embodiment, if determining the security level of the memory, the unified security information management module 155 may update memory management information.

According to an embodiment, if receiving a request to store security information from the plurality of security information processing modules 153-1 to 153-n, the unified security information management module 155 may select (or determine) a memory (or the memory management module 157) to store the security information among the plurality of memories 110-1 to 110-n. According to an embodiment, the unified security information management module 155 may select a memory different from a memory (or a secured region) requested to store security information by an application and may store the security information in the selected memory.

According to an embodiment, the unified security information management module 155 may select a memory (or a secured region) to store security information, based on a security information management policy. According to an embodiment, the security information management policy may be received from the external server. For example, if the electronic device 100 uses an MDM service, it may receive the security information management policy from the MDM server. The security information management policy may be for specifying a rule for specifying or selecting a memory to store security information, based on a type of the security information or a type of an application.

Figure 4:
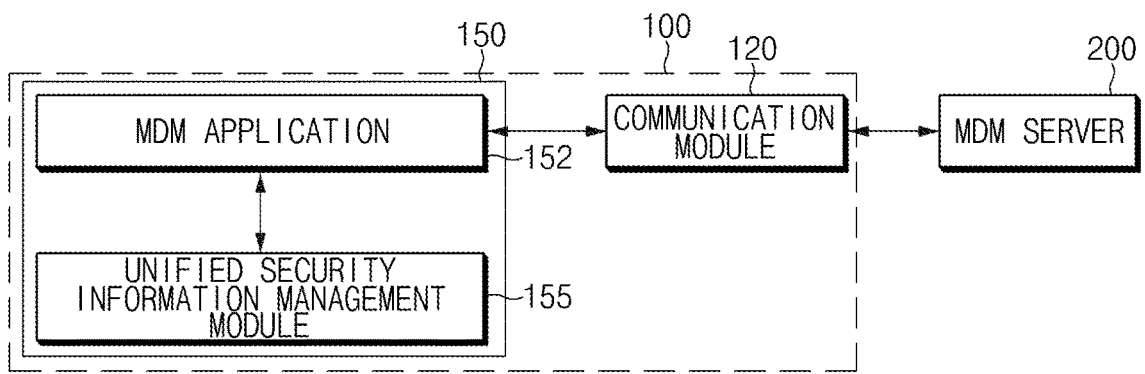
FIG. 4 is a block diagram illustrating a configuration of an electronic device using a mobile device management (MDM) service according to various embodiments of the present disclosure.

FIG. 4 is a block diagram illustrating a configuration of an electronic device using a MDM service according to various embodiments of the present disclosure.

Referring to FIG. 4, a communication module 120 may communicate with an MDM server 200. According to an embodiment, an electronic device 100 may use an MDM service using an MDM application 152 executed by a control module 150. According to an embodiment, the control module 150 may send memory management information to the MDM server 200 through the communication module 120. If receiving the memory management information, the MDM server 200 may determine a security level of a memory using the memory management information and may send the security level of the memory to the electronic device 100. According to an embodiment, the communication module 120 may receive the security level of the memory from the MDM server 200. The security level of the memory, received from the MDM server 200, may be sent to a unified security information management module 155 through the MDM application 152.

According to an embodiment, the communication module 120 may receive a security information management policy from the MDM server 200. According to an embodiment, the communication module 120 may change a security information management policy or may receive a security information management policy at a specific period. The security information management policy received from the MDM server 200 may be sent to the unified security information management module 155 through the MDM application 152.

The unified security information management module 155 may select a memory to store security information, based on a plurality of security information management policies, each of which has a priority order. There may be a state where the unified security information management module 155 does not select a memory to store security information based on a security information management policy or does not store security information in a selected memory, based on a situation. The state may be a state where there is no a memory of a specific security level or more or where a selected memory is currently unavailable. According to an embodiment, if not storing security information in a selected memory based on a first security information management policy, the unified security information management module 155 may select a memory to store the security information, based on a second security information management policy. If a memory having the highest security level is selected among available memories or if there is a memory specified by an application, the second security information management policy may be for selecting the corresponding memory. According to an embodiment, a memory management module 157 of FIG. 3 may determine whether a memory is in an available state and may send a state of the memory to the unified security information management module 155. For example, if a memory is in a removed state or if the memory has its insufficient storage space, the memory management module 157 may determine that the memory is in an unavailable state.

According to an embodiment, the unified security information management module 155 may select a memory to store security information, based on a security level of each of a plurality of memories 110-1 to 110-n of FIG. 3. For example, the unified security information management module 155 may select a memory of a specific security level based on a specific rule (e.g., rights of an application, a category of the application, an area where the application is installed, a path of downloading the application, and the like). For example, the specific rule may be present in the electronic device 100 or may be included in a security information management policy and may then be received from an external server.

According to an embodiment, the unified security information management module 155 may select a memory to store security information, based on rights set to an application which requests to store security information. The rights set to the application may be determined based on, for example, a type of an authentication key signed in the application. For one example, if the authentication key signed in the application is a platform key, the corresponding application may have the right to have a system level in the electronic device 100. For another example, if the authentication key signed in the application is any key except for the platform key, the corresponding application may have relatively lower rights in the electronic device 100. According to an embodiment, if the application which requests to store the security information has higher rights (e.g., if the application is signed with the platform key), the unified security information management module 155 may select a memory with a higher security level. If the application has lower rights (if the application is signed with any key), the unified security information management module 155 may select a memory with a relative lower security level.

According to an embodiment, the unified security information management module 155 may select a memory to store the security information, based on a category of the application which requests to store security information. The category of the application may be determined by information included in a file for installing the application or a category set in an application store and the like. For example, if the application which requests to store the security information belongs to a financial category, the unified security information management module 155 may select a memory with a higher security level. If the application belongs to a game or music category, the unified security information management module 155 may select a memory with a relatively lower security level.

According to an embodiment, the unified security information management module 155 may select a memory to store security information, based on whether the application which requests to store the security information is an enterprise application or a personal application.

Figure 5:
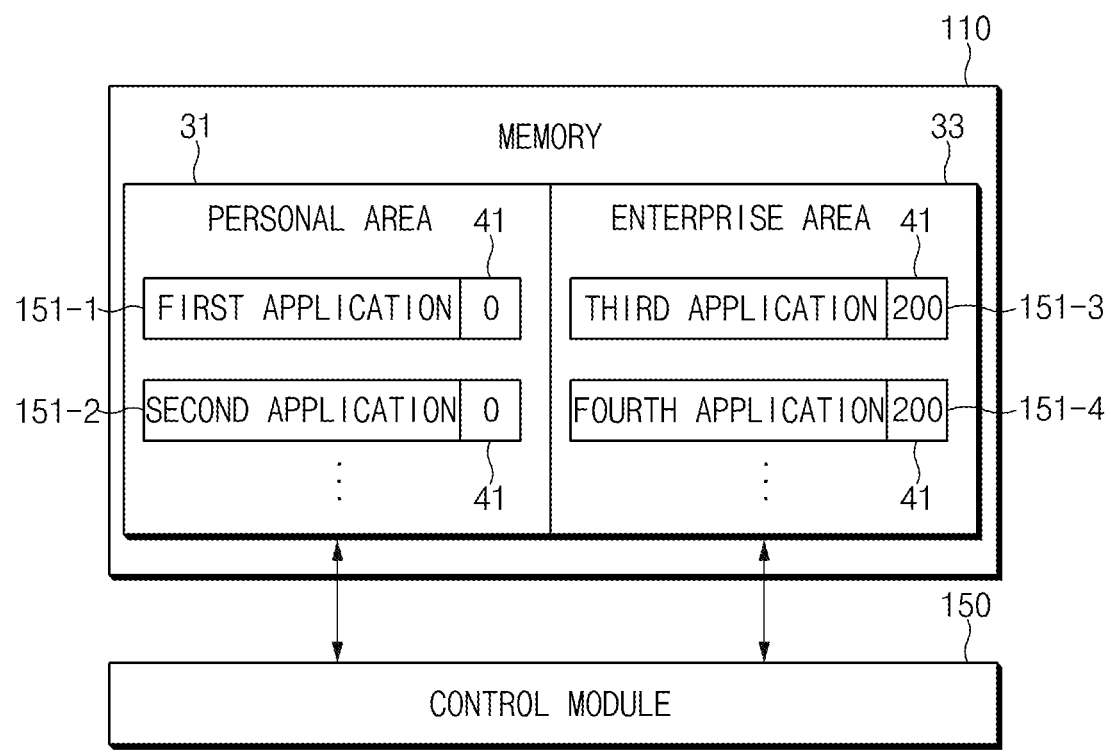
FIG. 5 is a block diagram illustrating a memory structure according to various embodiments of the present disclosure.

FIG. 5 is a block diagram illustrating a memory structure according to various embodiments of the present disclosure.

Referring to FIG. 5, a memory 110 may include a personal area 31 and an enterprise region 33. According to an embodiment, the memory 110 may be one of a plurality of memories 110-1 to 110-n shown in FIG. 1.

According to an embodiment, a control module 150 may classify and manage an area where an application is installed into the personal area 31 and the enterprise area 33 (or business area). According to an embodiment, the control module 150 may install a personal application (e.g., a first application 151-1 and a second application 151-2) in the personal area 31 and may install an enterprise application (e.g., a third application 151-3 and a fourth application 154-4) in the enterprise area 33.

According to an embodiment, the personal application or the enterprise application may include an identifier (ID) 41 indicating the right to execute (or install) the personal application or the enterprise application. According to an embodiment, the ID 41 may differ based on whether the application is the personal application or the enterprise application. For example, referring to FIG. 5, the personal application may have the ID "0", and the enterprise application may have the ID "200". According to an embodiment, the control module 150 may assign the ID 41 to an application based on rights of a user (or a manager) who installs the application. According to an embodiment, the ID 41 may correspond to a user ID in an OS which supports multiple users. According to an embodiment, the control module 150 may determine an area, where an application will be installed, based on an ID assigned to the application. According to an embodiment, if a specific application requests an application having a different ID to send data or execute a specific function, the control module 150 may not permit the corresponding request.

According to an embodiment, whether the application is the enterprise application or the personal application may be determined based on an area where the application is installed. According to an embodiment, the unified security information management module 155 may verify a path of installing an application. If the application is installed in the enterprise area 33, the unified security information management module 155 may determine the application as the enterprise application. If the application is installed in the personal area 31, the unified security information management module 155 may determine the application as the personal application.

According to an embodiment, whether the application is the enterprise application or the personal application may be determined based on an ID assigned to the application. According to an embodiment, if a personal ID (e.g., "0") is included in an application, the unified security information management module 155 may determine the application as the personal application. If an enterprise (or manager) ID (e.g., "200") is included in an application, the unified security information management module 155 may determine the application as the enterprise application.

According to another embodiment, whether an application is the enterprise application or the personal application may be determined based on a path of downloading the application. For example, the unified security information management module 155 may determine an application, downloaded from an enterprise-only application store or an MDM server, as the enterprise application. According to an embodiment, if the application which requests to store the security information is the enterprise application, the unified security information management module 155 may select a memory with a higher security level. If the application is the personal application, the unified security information management module 155 may select a memory with a relatively lower security level.

According to an embodiment, an application layer 1 of FIG. 3 may include a plurality of memory management modules 157-1 to 157-$n$. Each of the plurality of memory management modules 157-1 to 157-$n$ may access each of a plurality of memories 110-1 to 110-$n$ of FIG. 3 and may store security information in each of the plurality of memories 110-1 to 110-$n$, or may read the stored information from each of the plurality of memories 110-1 to 110-$n$. According to an embodiment, a memory management module 157 of FIG. 3 may be downloaded and installed in the form of an application from the outside. For example, if the new memory 110 is added to an electronic device 100 of FIG. 4 to be used, a user of the electronic device 100 may download and install the memory management module 157 which accesses the memory 110 and manages the memory 110.

According to an embodiment, if a memory to store security information is selected, the unified security information management module 155 may send a request to store security information to the memory management module 157 which manages the selected memory. Receiving the request to store the security information, the memory management module 157 may access a memory managed by the memory management module 157 and may store the security information in the memory.

An embodiment is exemplified as the memory management module 157 is included in the application layer 1. However, embodiments of the present disclosure are not limited thereto. For example, the memory management module 157 may be implemented in the form of being included in a framework layer 3 of FIG. 3.

FIGS. 6A to 6E are drawings illustrating a user interface displayed on a display according to various embodiments of the present disclosure.

Referring to FIG. 6A, a display 140 may display a security information management menu. According to an embodiment, the security information management menu may be displayed based on memory management information. According to an embodiment, the security information management menu may include a memory management module menu 50 and a security information menu 60. If a use of an electronic device 100 of FIG. 1 selects the memory management module menu 50, the display 140 may display a user interface shown in FIG. 6B.

Referring to FIG. 6B, the display 140 may display a list of memory management modules installed in the electronic device 100. If the user selects one memory management module in the memory management module list displayed on the display 140, the display 140 may display a user interface shown in FIG. 6C.

Referring to FIG. 6C, the display 140 may display detailed information about the memory management module selected by the user. For example, the detailed information about the memory management module may include a title of the memory management module, a manufacturer of the memory management module, information indicating whether the memory management module is removable.

If the user selects the security information menu 60 on the user interface shown in FIG. 6A, the display 140 may display a user interface shown in FIG. 6D.

Referring to FIG. 6D, the display 140 may display a list of security information stored in a memory. If the user selects one security information in the security information list displayed on the display 140, the display 140 may display a user interface shown in FIG. 6E.

Referring to FIG. 6E, the display 140 may display detailed information about the security information selected by the user.

According to various embodiments, an electronic device may include at least one memory configured to include a first secured region and a second secured region different from the first secured region and a processor configured to electrically connect with the at least one memory. The at least one memory may store instructions, when executed, for instructing the processor to execute an application program configured to store data in the first secured region, to receive an input for storing the data, through the application program, and to store the data in the second secured region rather than the first secured region, in response to the input.

According to various embodiments, the at least one memory may include at least one of a first memory device configured to include the first secured region or a second memory device configured to include the second secured region.

According to various embodiments, the at least one of the first memory device or the second memory device may include at least one of an embedded secure element (eSE), a subscriber identity module (SIM) card, a secure digital (SD) card, or a flash memory.

According to various embodiments, the instructions may instruct the processor to provide a framework layer which interfaces with the application program and to store the data in the second secured region rather than the first secured region in response to the input by at least part of the framework layer.

According to various embodiments, the instructions may instruct the processor to receive information about the at least one memory, to determine a security level of each of the at least one memory based on the information about the at least one memory, and to determine the second secured region to store the security information, based on the determined security level.

According to various embodiments, the instructions may instruct the processor to determine the second region to store the security information, based on a security information management policy received from an external server.

According to various embodiments, an electronic device may include at least one memory configured to include a secured region to store security information and a processor configured to electrically connect with the at least one memory.

The processor may be configured to execute an application program configured to store security information in a first secured region, to receive a request to store security information from the application program, and to store the security information in a second secured region in response to the request.

According to various embodiments, the processor may receive information about the at least one memory, determines a security level of each of the at least one memory based on the information about the at least one memory, and determines the secured region to store the security information, based on the determined security level.

According to various embodiments, the information about the at least one memory may include at least one of memory identification information, secured region identification information, information indicating whether the memory is removable, information indicating whether the memory is a hardwarily independent memory, or information about a manufacturer of the memory.

According to various embodiments, the processor may determine the secured region to store the security information, based on a security information management policy received from an external server.

According to various embodiments, the processor may determine the secured region to store the security information, based on a second security information management policy, if the security information is not stored in a secured region determined based on a first security information management policy.

According to various embodiments, the processor may determine the secured region to store the security information, based on rights set to an application which requests to store the security information.

According to various embodiments, the processor may determine the secured region to store the security information, based on a category of an application which requests to store the security information.

According to various embodiments, the processor may determine the secured region to store the security information, based on at least one of an area where an application which requests to store the security information is installed, an identifier assigned to the application, or a path of downloading the application.

According to various embodiments, the electronic device may further include a display configured to display a list of memories which store security information among the at least one memory or a list of security information stored in the at least one memory.

Figure 7:
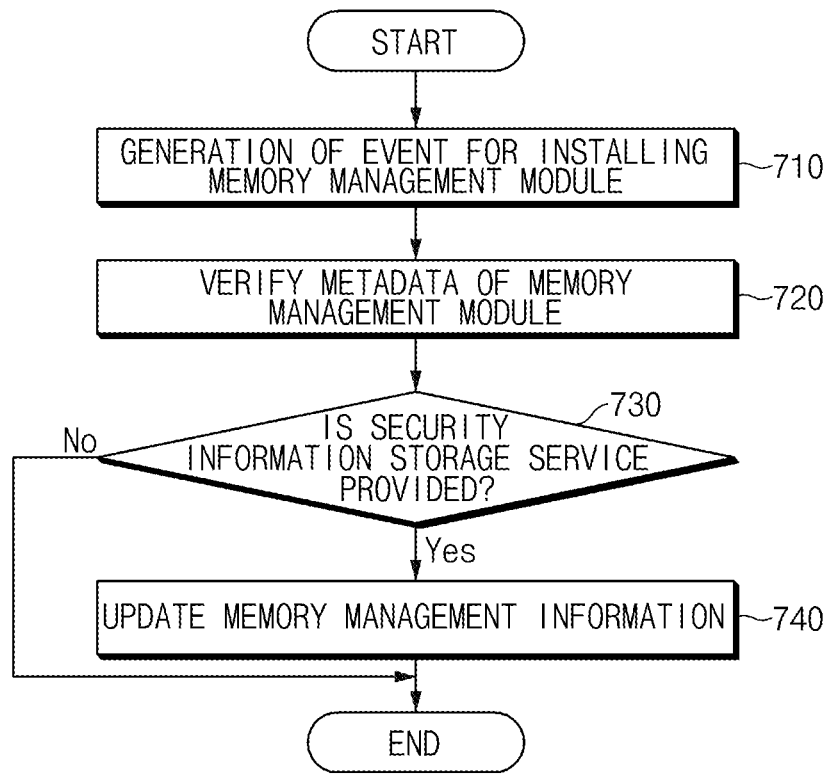
FIG. 7 is a flowchart illustrating a method for storing security information in an electronic device according to various embodiments of the present disclosure.

FIG. 7 is a flowchart illustrating a method for storing security information in an electronic device according to various embodiments of the present disclosure.

FIG. 7 illustrates operations of updating memory management information by an electronic device 100 of FIG. 1 if a memory management module is installed in the electronic device 100. The operations shown in FIG. 7 may include operations processed by the electronic device 100. Therefore, although there are contents omitted below, contents described about the electronic device 100 with reference to FIGS. 1, 2, 3, 4, 5 and 6A to 6E may be applied to the operations shown in FIG. 7.

Referring to FIG. 7, in operation 710, an event for installing a memory management module in the electronic device 100 may be generated. According to an embodiment, if the memory management module is installed in the electronic device 100, the memory management module may inform a unified security information management module that the memory management module is installed.

If the event for installing the memory management module is generated, in operation 720, the electronic device 100 may verify metadata of the memory management module. For example, the memory management module may send information (e.g., metadata) about a memory accessible by the memory management module to the unified security information management module based on a request of the unified security information management module. The information about the memory may include, for example, at least one of memory identification information, secured region identification information, information indicating whether the memory is removable, information indicating whether the memory is a hardwarily independent memory, or information about a manufacturer of the memory. The information about the memory may include another information other than the above-mentioned information.

In operation 730, the electronic device 100 may determine whether the memory management module provides a security information storage service. For example, the electronic device 100 may determine whether the memory management module stores security information based on a request of the unified security information management module. According to an embodiment, the unified security information management module may determine whether it is possible to store security information using information received from the memory management module.

If determining that the memory management module provides the security information storage service (e.g., if determining that it is possible to store the security information), in operation 740, the electronic device 100 may update memory management information. For example, the unified security information management module may add a newly installed memory management module to the memory management information. The memory management information may include, for example, a list of memories which may store security information among memories included in the electronic device 100, memory related information, a list of security information stored in each of the memories, a security level assigned to each of the memories, and the like.

According to an embodiment, the electronic device 100 may display memory management information based on a user command. For one example, the electronic device 100 may display a list of memories (or secured regions) which may store security information among a plurality of memories. For another example, the electronic device 100 may display a list of security information stored in the plurality of memories.

Figure 8:
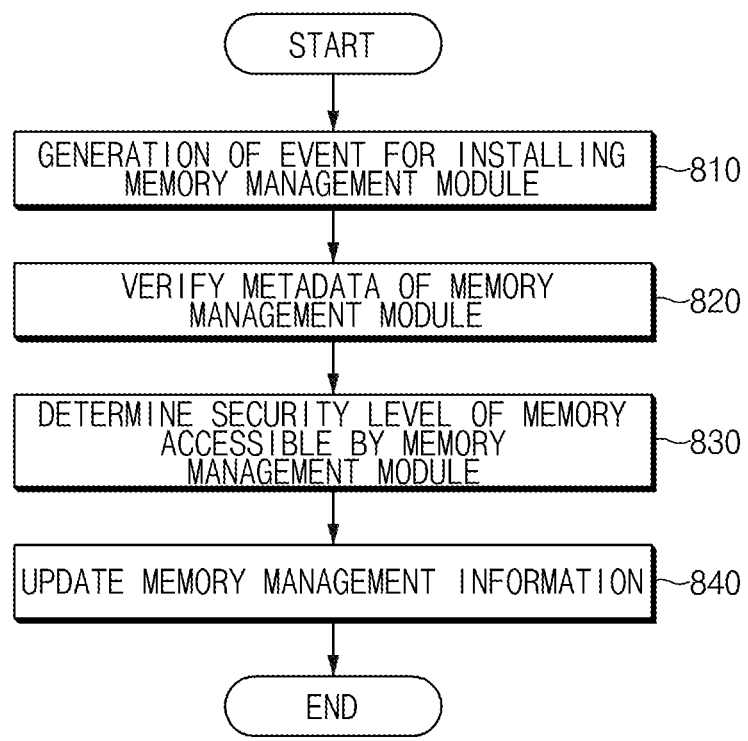
FIG. 8 is a flowchart illustrating a method for storing security information in an electronic device according to various embodiments of the present disclosure.

FIG. 8 is a flowchart illustrating a method for storing security information in an electronic device according to various embodiments of the present disclosure.

FIG. 8 illustrates operations of updating memory management information by an electronic device 100 of FIG. 1 if a memory management module is installed in the electronic device 100. The operations shown in FIG. 8 may include operations processed by the electronic device 100. Therefore, although there are contents omitted below, contents described about the electronic device 100 with reference to FIGS. 1, 2, 3, 4, 5 and 6A to 6E may be applied to the operations shown in FIG. 8.

Referring to FIG. 8, in operation 810, an event for installing a memory management module in the electronic device 100 may be generated. According to an embodiment, if the memory management module is installed in the electronic device 100, the memory management module may inform a unified security information management module that the memory management module is installed.

If the event for installing the memory management module is generated, in operation 820, the electronic device 100 may verify metadata of the memory management module. For example, the memory management module may send information (e.g., metadata) about a memory accessible by the memory management module to the unified security information management module based on a request of the unified security information management module. The information about the memory may include, for example, at least one of memory identification information, secured region identification information, information indicating whether the memory is removable, information indicating whether the memory is a hardwarily independent memory, or information about a manufacturer of the memory. The information about the memory may include another information other than the above-mentioned information.

In operation 830, the electronic device 100 may determine a security level of a memory accessible by the memory management module. For example, the unified security information management module may determine the security level of the memory using information received from the memory management module. According to an embodiment, the electronic device 100 may determine the security level of the memory for a memory management module determined as it is possible to store security information.

In operation 840, the electronic device 100 may update memory management information. For example, the unified security information management module may update a security level of a memory accessible by a newly installed memory management module in the memory management information.

Figure 9:
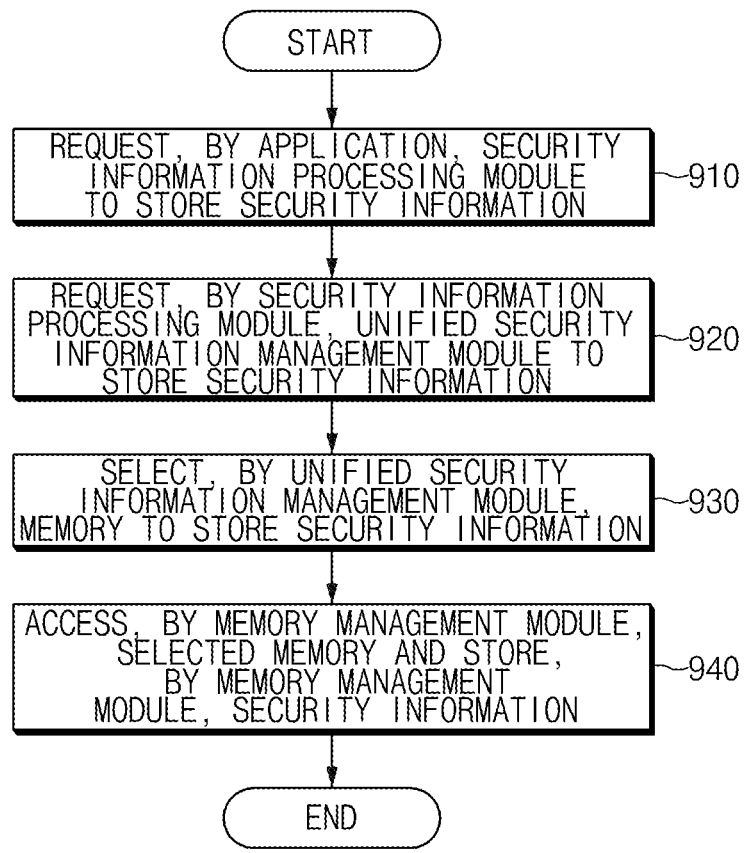
FIG. 9 is a flowchart illustrating a method for storing security information in an electronic device according to various embodiments of the present disclosure.

FIG. 9 is a flowchart illustrating a method for storing security information in an electronic device according to various embodiments of the present disclosure.

FIG. 9 illustrates operations of storing security information in a memory based on a request of an application. The operations shown in FIG. 9 may include operations processed by the electronic device 100. Therefore, although there are contents omitted below, contents described about the electronic device 100 with reference to FIGS. 1, 2, 3, 4, 5 and 6A to 6E may be applied to the operations shown in FIG. 9.

Referring to FIG. 9, in operation 910, an application may request a security information processing module to store security information. For example, if an event for storing security information is generated, an application executed by the electronic device 100 may request the security information processing module to store the security information.

According to an embodiment, the application may request a specific memory (or a secured region) to store the security information. For example, the application may be programmed to store security information in a specific memory by an application developer. The security information may include a variety of information, for example, a certificate, an authentication key, a password, payment information, and the like, necessary for security to be prevented from flowing to others. According to an embodiment, the application may an API module which may be used by the application and may request the selected API to store security information. According to an embodiment, a service or module, driven in an OS (or a kernel) or a framework, as well as the application may request the security information processing module to store the security information.

In operation 920, the security information processing module may request a unified security information management module to store the security information.

In operation 930, the unified security information management module may select (or determine) a memory to store the security information. According to an embodiment, the unified security information management module may select a memory different from a memory (or a secured region) request to store the security information by the application and may store the security information in the selected memory. According to an embodiment, the unified security information management module may process requests to store security information, received from a plurality of security information processing modules, in a unified way. The unified security information management module may select a memory to store the security information, based on various methods. A description will be given in detail of this with reference to FIGS. 10, 11, 12, and 13. According to an embodiment, the unified security information management module may request a memory management module which manages the selected memory to store the security information.

In operation 940, the memory management module may access the selected memory and may store the security information in the memory.

Figure 10:
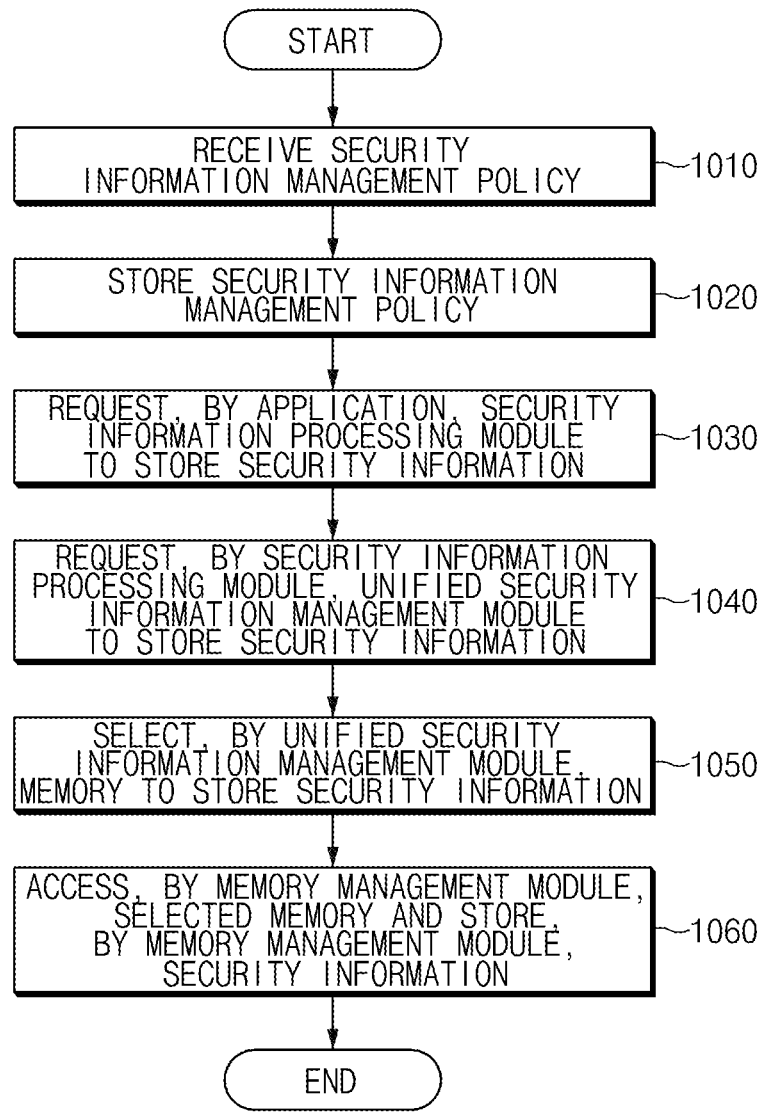
FIG. 10 is a flowchart illustrating a method for storing security information in an electronic device according to various embodiments of the present disclosure.

FIG. 10 is a flowchart illustrating a method for storing security information in an electronic device according to various embodiments of the present disclosure.

FIG. 10 illustrates operations of storing security information in a memory based on a request of an application. The operations shown in FIG. 10 may include operations processed by the electronic device 100. Therefore, although there are contents omitted below, contents described about the electronic device 100 with reference to FIGS. 1, 2, 3, 4, 5 and 6A to 6E may be applied to the operations shown in FIG. 10.

Referring to FIG. 10, in operation 1010, the electronic device 100 may receive a security information management policy. According to an embodiment, the electronic device 100 may receive the security information management policy from an external server. If the electronic device 100 uses an MDM service, the external server may be, for example, an MDM server. The security information management policy may be for specifying a rule for specifying or selecting a memory to store security information, based on a type of the security information or a type of an application.

In operation 1020, the electronic device 100 may store the security information management policy. According to an embodiment, the electronic device 100 may store the security information management policy in one of a plurality of memories. According to an embodiment, the security information management policy may be stored in the same or different memory from the memory which stores the security information. According to an embodiment, the electronic device 100 may store the security information management policy in a memory area accessible when a control module 150 of FIG. 2 operates in a security mode 23 of FIG. 2.

In operation 1030, an application may request a security information processing module to store the security information. For example, if an event for storing the security information is generated, an application being executed in the electronic device 100 may request the security information processing module to store the security information. The security information may include a variety of information, for example, a certificate, an authentication key, a password, payment information, and the like, necessary for security to be prevented from flowing to others. According to an embodiment, the application may select a security information processing module which may be used by the application and may request the selected security information processing module to store the security information. According to an embodiment, a service or module, driven in an OS (or a kernel) or a framework, as well as the application may request the security information processing module to store the security information.

In operation 1040, the security information processing module may request a unified security information management module to store the security information.

In operation 1050, the unified security information management module may select a memory to store the security information, based on the security information management policy. According to an embodiment, the unified security information management module may select a memory, corresponding to the application which requests to store the security information, based on the security information management policy. According to an embodiment, the unified security information management module may select a memory to store the security information, based on the rule specified by the security information management policy. According to an embodiment, the unified security information management module may select a memory based on a security level of the memory described with reference to FIGS. 6A to 6E. For example, the unified security information management module may select a memory of a specific security level based on a specific rule (e.g., rights of an application, a category of the application, an area where the application is installed, a path of downloading the application, and the like).

In operation 1060, the memory management module may access the selected memory and may store the security information in the memory.

Figure 11:
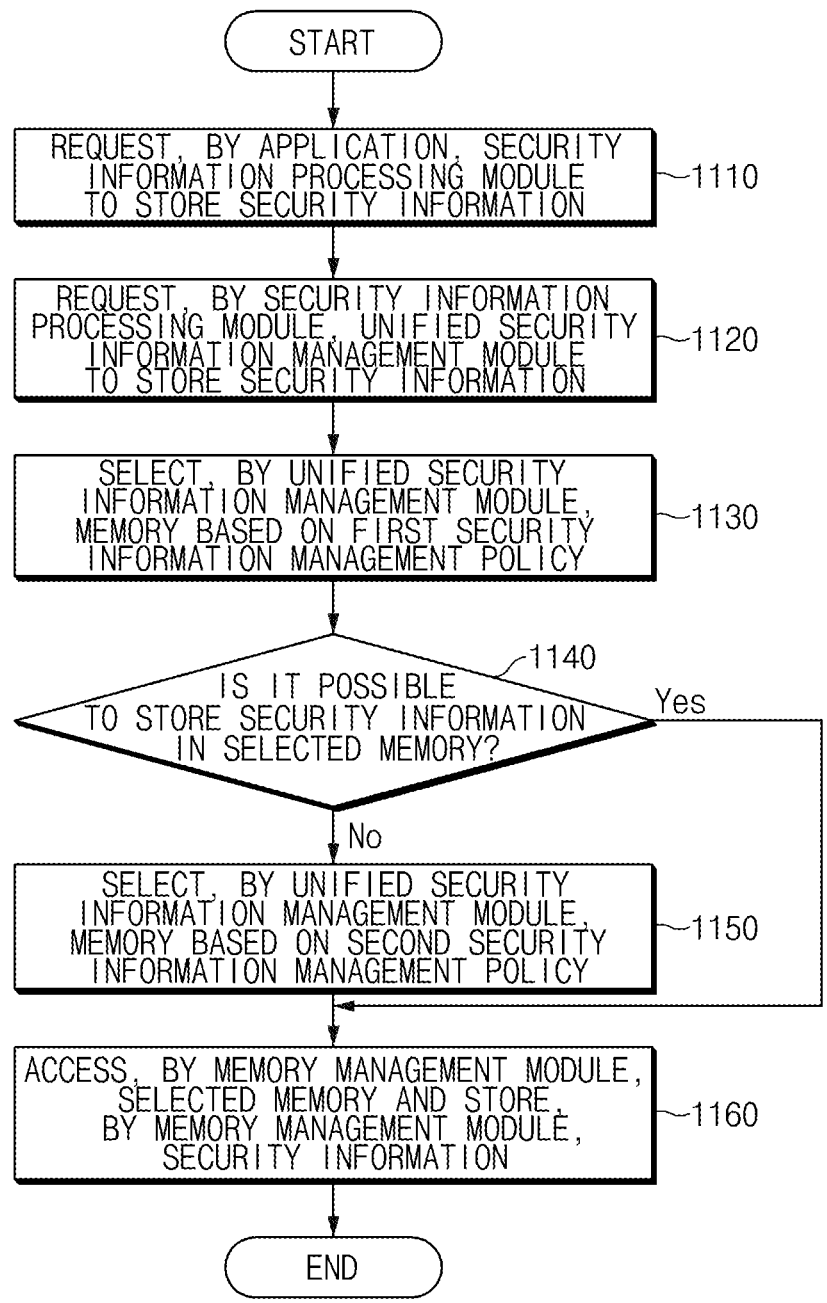
FIG. 11 is a flowchart illustrating a method for storing security information in an electronic device according to various embodiments of the present disclosure.

FIG. 11 is a flowchart illustrating a method for storing security information in an electronic device according to various embodiments of the present disclosure.

FIG. 11 illustrates operations of storing security information in a memory based on a request of an application. The operations shown in FIG. 11 may include operations processed by an electronic device 100 shown in FIG. 1. Therefore, although there are contents omitted below, contents described about the electronic device 100 with reference to FIGS. 1, 2, 3, 4, 5 and 6A to 6E may be applied to the operations shown in FIG. 11.

Referring to FIG. 11, in operation 1110, an application may request a security information processing module to store security information. For example, if an event for storing the security information is generated, an application being executed in the electronic device 100 may request the security information processing module to store the security information. The security information may include a variety of information, for example, a certificate, an authentication key, a password, payment information, and the like, necessary for security to be prevented from flowing to others. According to an embodiment, the application may select a security information processing module which may be used by the application and may request the selected security information processing module to store the security information. According to an embodiment, a service or module, driven in an OS (or a kernel) or a framework, as well as the application may request the security information processing module to store the security information.

In operation 1120, the security information processing module may request a unified security information management module to store the security information.

In operation 1130, the unified security information management module may select a memory to store the security information, based on a first security information management policy. According to an embodiment, the unified security information management module may select a memory, corresponding to the application which requests to store the security information, based on a plurality of security information management policies, each of which has a priority order. According to an embodiment, the unified security information management module may select a memory to store the security information, based on a rule specified by a security information management policy.

According to an embodiment, the unified security information management module may select a memory based on a security level of the memory. For example, the unified security information management module may select a memory of a specific security level based on a specific rule (e.g., rights of an application, a category of the application, an area where the application is installed, a path of downloading the application, and the like).

In operation 1140, the unified security information management module may determine whether to store the security information in the selected memory. There may be a state, where the unified security information management module does not select a memory to store the security information based on a security information management policy or does not store the security information in the selected memory, based on a situation. For example, if there is no memory of a specific security level or more or if the selected memory is currently in an unavailable state (e.g., if a memory is in a removed state or if the memory has its insufficient storage space), the unified security information management module may determine that the security information may not be stored in the memory.

If determining that the security information may be stored in the selected memory, in operation 1160, the memory management module may access the selected memory and may store the security information in the memory.

If determining that the security information may not be stored in the selected memory, in operation 1150, the unified security information management module may select a memory to store the security information, based on a second security information management policy. For example, the unified security information management module may select a memory with the highest security level among available memories or may select a memory specified by the application, based on the second security information management policy.

If the memory is selected based on the second security information management policy, in operation 1160, the memory management module may access the selected memory and may store the security information in the memory.

Figure 12:
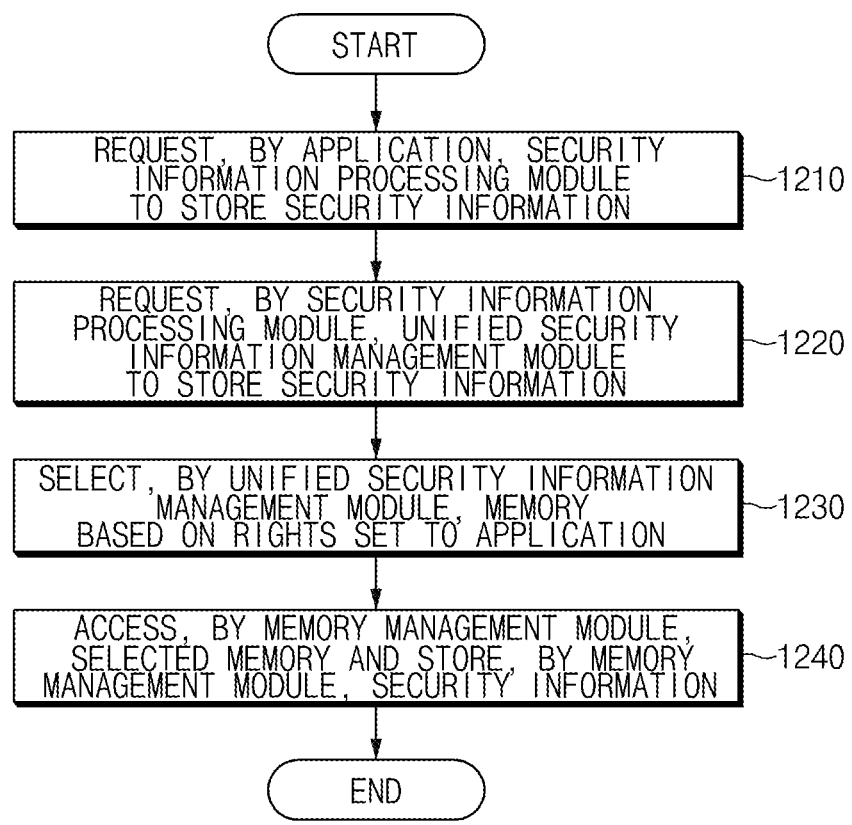
FIG. 12 is a flowchart illustrating a method for storing security information in an electronic device according to various embodiments of the present disclosure.

FIG. 12 is a flowchart illustrating a method for storing security information in an electronic device according to various embodiments of the present disclosure.

FIG. 12 illustrates operations of storing security information in a memory based on a request of an application. The operations shown in FIG. 12 may include operations processed by an electronic device 100 shown in FIG. 1. Therefore, although there are contents omitted below, contents described about the electronic device 100 with reference to FIGS. 1, 2, 3, 4, 5 and 6A to 6E may be applied to the operations shown in FIG. 12.

Referring to FIG. 12, in operation 1210, an application may request a security information processing module to store security information. For example, if an event for storing the security information is generated, an application being executed in the electronic device 100 may request the security information processing module to store the security information. The security information may include a variety of information, for example, a certificate, an authentication key, a password, payment information, and the like, necessary for security to be prevented from flowing to others. According to an embodiment, the application may select a security information processing module which may be used by the application and may request the selected security information processing module to store the security information. According to an embodiment, a service or module, driven in an OS (or a kernel) or a framework, as well as the application may request the security information processing module to store the security information.

In operation 1220, the security information processing module may request a unified security information management module to store the security information.

In operation 1230, the unified security information management module may select a memory to store the security information, based on rights set to the application which requests to store the security information. The rights set to the application may be determined based on, for example, a type of an authentication key signed in the application. For one example, if the authentication key signed in the application is a platform key, the corresponding application may have the right to have a system level in the electronic device 100. For another example, if the authentication key signed in the application is any key except for the platform key, the corresponding application may have relatively lower rights in the electronic device 100. According to an embodiment, if the application which requests to store the security information has high rights (e.g., if the application is signed with the platform key), the unified security information management module may select a memory with a higher security level. If the application has low rights (if the application is signed with any key), the unified security information management module may select a memory with a relative lower security level.

In operation 1240, the memory management module may access the selected memory and may store the security information in the memory.

Figure 13:
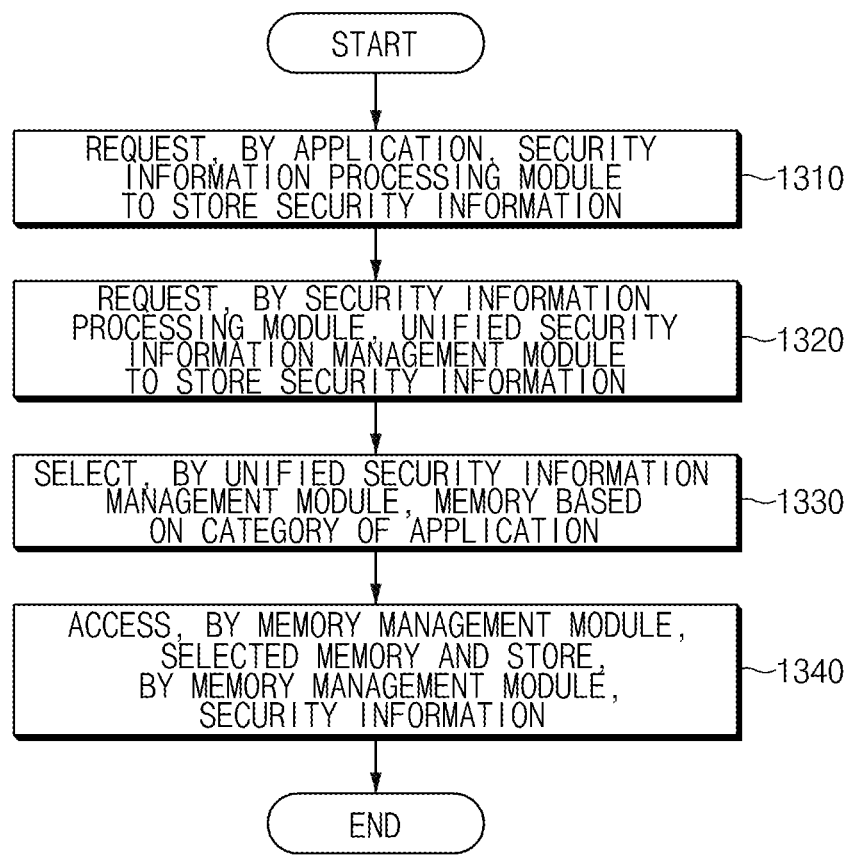
FIG. 13 is a flowchart illustrating a method for storing security information in an electronic device according to various embodiments of the present disclosure.

FIG. 13 is a flowchart illustrating a method for storing security information in an electronic device according to various embodiments of the present disclosure.

FIG. 13 illustrates operations of storing security information in a memory based on a request of an application. The operations shown in FIG. 13 may include operations processed by an electronic device 100 shown in FIG. 1. Therefore, although there are contents omitted below, contents described about the electronic device 100 with reference to FIGS. 1, 2, 3, 4, 5 and 6A to 6E may be applied to the operations shown in FIG. 13.

Referring to FIG. 13, in operation 1310, an application may request a security information processing module to store security information. For example, if an event for storing the security information is generated, an application being executed in the electronic device 100 may request the security information processing module to store the security information. The security information may include a variety of information, for example, a certificate, an authentication key, a password, payment information, and the like, necessary for security to be prevented from flowing to others. According to an embodiment, the application may select a security information processing module which may be used by the application and may request the selected security information processing module to store the security information. According to an embodiment, a service or module, driven in an OS (or a kernel) or a framework, as well as the application may request the security information processing module to store the security information.

In operation 1320, the security information processing module may request a unified security information management module to store the security information.

In operation 1330, the unified security information management module may select a memory to store the security information, based on a category of the application which requests to store the security information. The category of the application may be determined by, for example, information included in a file for installing the application or a category set in an application store and the like. For example, if the application which requests to store the security information belongs to a financial category, the unified security information management module may select a memory with a higher security level. If the application belongs to a game or music category, the unified security information management module may select a memory with a relatively lower security level.

In operation 1340, the memory management module may access the selected memory and may store the security information in the memory.

Figure 14:
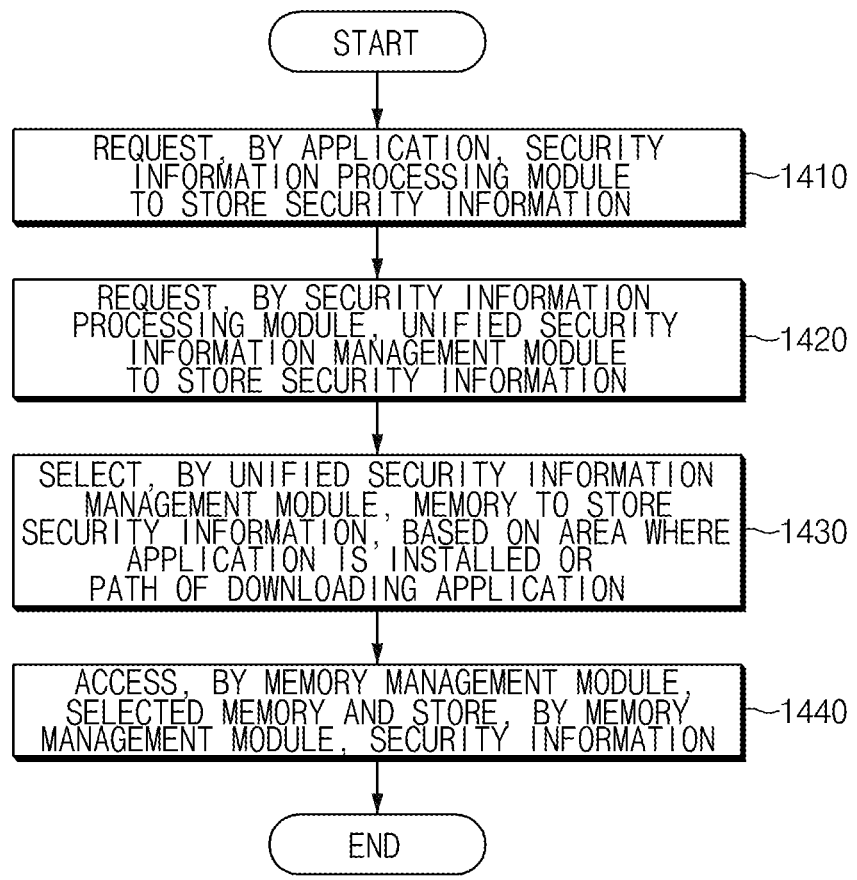
FIG. 14 is a flowchart illustrating a method for storing security information in an electronic device according to various embodiments of the present disclosure.

FIG. 14 is a flowchart illustrating a method for storing security information in an electronic device according to various embodiments of the present disclosure.

FIG. 14 illustrates operations of storing security information in a memory based on a request of an application. The operations shown in FIG. 14 may include operations processed by an electronic device 100 shown in FIG. 1. Therefore, although there are contents omitted below, contents described about the electronic device 100 with reference to FIGS. 1, 2, 3, 4, 5 and 6A to 6E may be applied to the operations shown in FIG. 14.

Referring to FIG. 14, in operation 1410, an application may request a security information processing module to store security information. For example, if an event for storing the security information is generated, an application being executed in the electronic device 100 may request the security information processing module to store the security information. The security information may include a variety of information, for example, a certificate, an authentication key, a password, payment information, and the like, necessary for security to be prevented from flowing to others. According to an embodiment, the application may select a security information processing module which may be used by the application and may request the selected security information processing module to store the security information. According to an embodiment, a service or module, driven in an OS (or a kernel) or a framework, as well as the application may request the security information processing module to store the security information.

In operation 1420, the security information processing module may request a unified security information management module to store the security information.

In operation 1430, the unified security information management module may select a memory to store the security information, based on an area where the application which requests to store the security information is installed or a path of downloading the application. According to an embodiment, the unified security information management module may determine whether the application is an enterprise application or a personal application, based on the area where the application which requests to store the security information is installed or the path of downloading the application. According to an embodiment, the electronic device 100 may classify and manage the area where the application is installed into a personal area and an enterprise area (or a business area). According to an embodiment, the unified security information management module may verify the path of installing the application. If the application is installed in the enterprise area, the unified security information management module may determine the application as the enterprise application. If the application is installed in the personal area, the unified security information management module may determine the application as the personal application. According to an embodiment, the unified security information management module may determine an application, downloaded from an enterprise-only application store or downloaded from an MDM server based on an MDM service, as the enterprise application. According to an embodiment, if the application which requests to store the security information is the enterprise application, the unified security information management module may select a memory with a higher security level. If the application is the personal application, the unified security information management module may select a memory with a relatively lower security level.

In operation 1440, the memory management module may access the selected memory and may store the security information in the memory.

According to various embodiments, a method for storing security information in an electronic device may include executing an application program configured to store security information in a first secured region, receiving a request to store the security information from the application program, and storing the security information in a second secured region in response to the request.

According to various embodiments, the storing of the security information in the second secured region may include obtaining information about at least one memory, including a secured region, included in the electronic device, determining a security level of each of the at least one memory based on the information about the at least one memory, and determining a secured region to store the security information, based on the determined security level.

According to various embodiments, the storing of the security information in the second secured region may include receiving a security information management policy from an external server and determining a secured region to store the security information, based on the security information management policy.

According to various embodiments, the determining of the secured region to store the security information based on the security information management policy may include determining the secured region to store the security information, based on a first security information management policy and determining the secured region to store the security information, based on a second security information management policy if the security information is not stored in the secured region determined based on the first security information management policy.

According to various embodiments, the storing of the security information in the second secured region may include storing the security information in the second secured region by at least part of a framework which interfaces with the application program.

Figure 15:
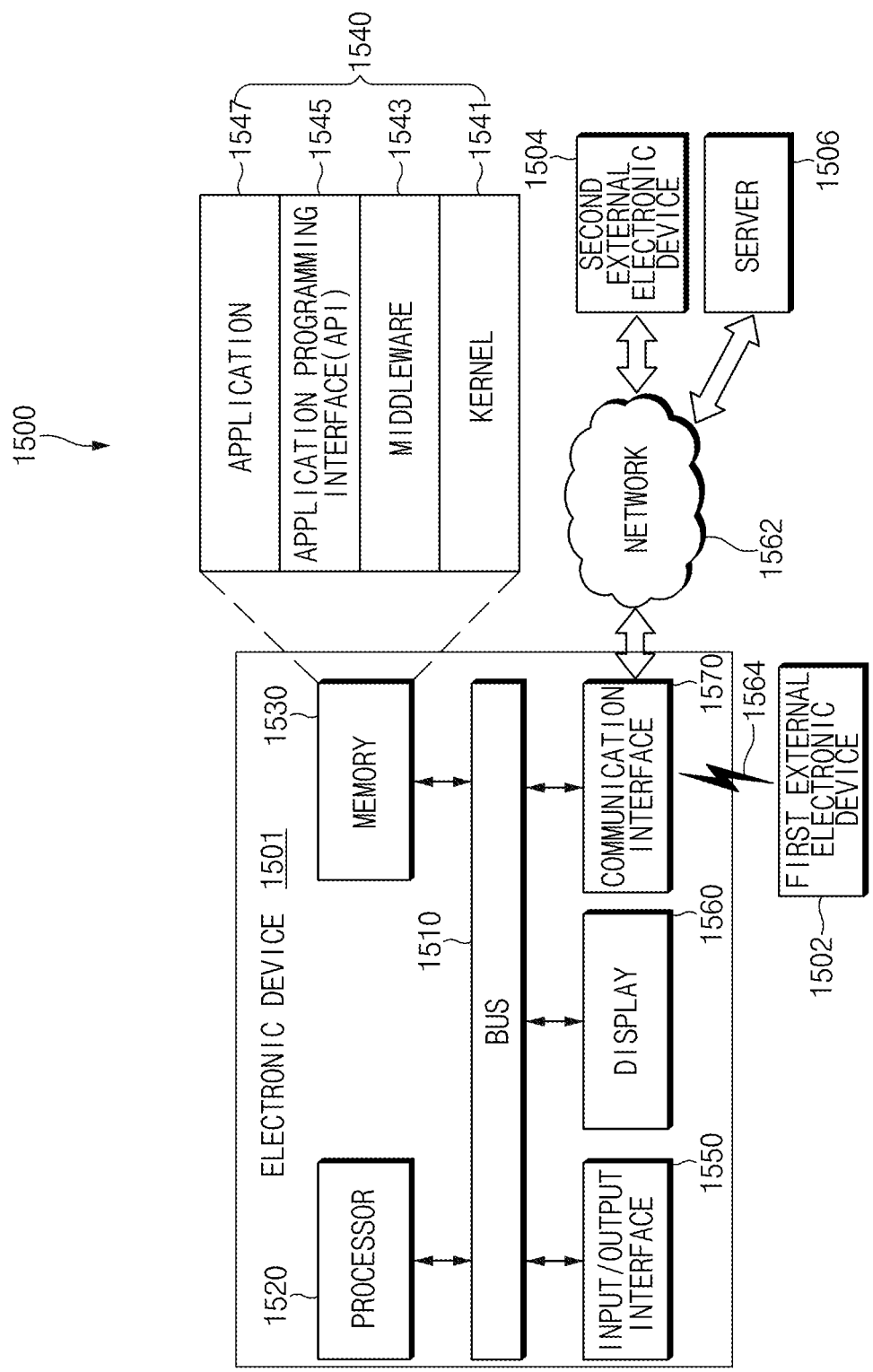
FIG. 15 is a block diagram illustrating a configuration of an electronic device in a network environment according to various embodiments of the present disclosure.

FIG. 15 is a block diagram illustrating a configuration of an electronic device in a network environment according to various embodiments of the present disclosure.

Referring to FIG. 15, a description will be given of an electronic device 1501 in a network environment 1500 in various embodiments with reference to FIG. 15. The electronic device 1501 may include, for example, all or part of an electronic device 100 shown in FIG. 1. The electronic device 1501 may include a bus 1510, a processor 1520, a memory 1530, an input and output interface 1550, a display 1560, and a communication interface 1570. In various embodiments, at least one of the components may be omitted from the electronic device 1501, or other components may be additionally included in the electronic device 1501.

The bus 1510 may be, for example, a circuit which connects the components 1520 to 1570 with each other and transmits a communication signal (e.g., a control message and/or data) between the components 1520 to 1570.

The processor 1520 may include one or more of a CPU, an AP, or a communication processor (CP). For example, the processor 1520 may perform calculation or data processing about control and/or communication of at least another of the components of the electronic device 1501.

The memory 1530 may include a volatile and/or non-volatile memory. The memory 1530 may store, for example, a command or data associated with at least another of the components of the electronic device 1501. According to an embodiment, the memory 1530 may software and/or a program 1540.

The program 1540 may include, for example, a kernel 1541, a middleware 1543, an API 1545, and/or at least one application program 1547 (or "at least one application"), and the like. At least part of the kernel 1541, the middleware 1543, or the API 1545 may be referred to as an OS.

The kernel 1541 may control or manage, for example, system resources (e.g., the bus 1510, the processor 1520, or the memory 1530, and the like) used to execute an operation or function implemented in the other programs (e.g., the middleware 1543, the API 1545, or the application program 1547). Also, as the middleware 1543, the API 1545, or the application program 1547 accesses a separate component of the electronic device 1501, the kernel 1541 may provide an interface which may control or manage system resources.

The middleware 1543 may play a role as, for example, a go-between such that the API 1545 or the application program 1547 communicates with the kernel 1541 to communicate data. Also, the middleware 1543 may process one or more work requests, received from the application program 1547, in order of priority. For example, the middleware 1543 may assign priority which may use system resources (the bus 1510, the processor 1520, or the memory 1530, and the like) of the electronic device 1501 to at least one of the at least one application program 1547. For example, the middleware 1543 may perform scheduling or load balancing for the one or more work requests by processing the one or more work requests in order of the priority assigned to the at least one of the at least one application program 1547.

The API 1545 may be, for example, an interface in which the application program 1547 controls a function provided from the kernel 1541 or the middleware 1543. For example, the API 1545 may include at least one interface or function (e.g., a command) for file control, window control, image processing, or text control, and the like.

The input and output interface 1550 may play a role as, for example, an interface which may transmit a command or data input from a user or another external device to another component (or other components) of the electronic device 1501. Also, input and output interface 1550 may output an instruction or data received from another component (or other components) of the electronic device 1501 to the user or the other external device.

The display 1560 may include, for example, a liquid crystal display (LCD), a light emitting diode (LED) display, an organic LED (OLED) display, a microelectromechanical systems (MEMS) display, or an electronic paper display. The display 1560 may display, for example, a variety of content (e.g., text, images, videos, icons, or symbols, and the like) to the user. The display 1560 may include a touch screen, and may receive, for example, touch, gesture, proximity, or a hovering input using an electronic pen or part of a body of the user.

The communication interface 1570 may establish communication between, for example, the electronic device 1501 and an external device (e.g., a first external electronic device 1502, a second external electronic device 1504, or a server 1506). For example, the communication interface 1570 may connect to a network 1562 through wireless communication or wired communication and may communicate with the external device (e.g., the second external electronic device 1504 or the server 1506).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1564. The local-area communication 1564 may include, for example, at least one of wireless-fidelity (Wi-Fi) communication, BT communication, Bluetooth low energy (BLE) communication, Zigbee communication, NFC, magnetic secure transmission communication, or GNSS communication, and the like. The GNSS may include, for example, at least one of a global positioning system (GPS), a Glonass, a Beidou navigation satellite system (hereinafter referred to as "Beidou"), or a Galileo (i.e., the European global satellite-based navigation system). Hereinafter, the "GPS" used herein may be interchangeably with the "GNSS". The GNSS may include, for example, at least one of a GPS, a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS".

The wired communication may include at least one of, for example, universal serial bus (USB) communication, high definition multimedia interface (HDMI) communication, recommended standard 232 (RS-232) communication, or plain old telephone service (POTS) communication, and the like. The network 1562 may include a telecommunications network, for example, at least one of a computer network (e.g., a local area network (LAN) or a wide area network (WAN)), the Internet, or a telephone network.

Each of the first and second external electronic devices 1502 and 1504 may be the same as or different device from the electronic device 1501. According to an embodiment, the server 1506 may include a group of one or more servers. According to various embodiments, all or some of operations executed in the electronic device 1501 may be executed in another electronic device or a plurality of electronic devices (e.g., the first external electronic device 1502, the second external electronic device 1504, or the server 1506). According to an embodiment, if the electronic device 1501 should perform any function or service automatically or according to a request, it may request another device (e.g., the first external electronic device 1502, the second external electronic device 1504, or the server 1506) to perform at least part of the function or service, rather than executing the function or service for itself or in addition to the function or service. The other electronic device (e.g., the first external electronic device 1502, the second external electronic device 1504, or the server 1506) may execute the requested function or the added function and may transmit the executed result to the electronic device 1501. The electronic device 1501 may process the received result without change or additionally and may provide the requested function or service. For this purpose, for example, cloud computing technologies, distributed computing technologies, or client-server computing technologies may be used.

Figure 16:
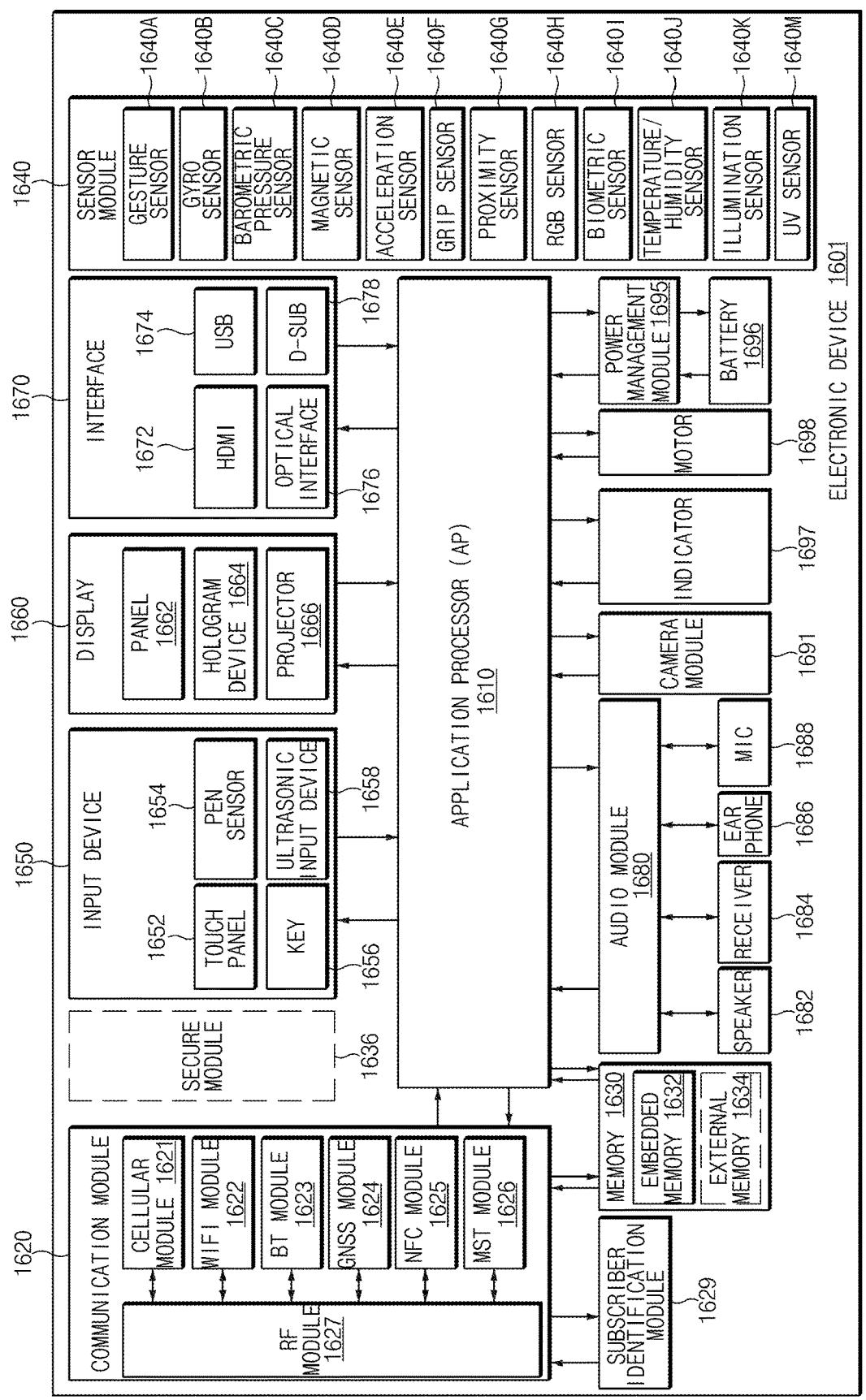
FIG. 16 is a block diagram illustrating a configuration of an electronic device according to various embodiments of the present disclosure.

FIG. 16 is a block diagram illustrating a configuration of an electronic device according to various embodiments.

Referring to FIG. 16, the electronic device 1601 may include, for example, all or part of an electronic device 100 shown in FIG. 1. The electronic device 1601 may include one or more processors 1610 (e.g., application processors (APs)), a communication module 1620, a subscriber identification module (SIM) 1629, a memory 1630, a secure module 1636, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an operating system (OS) or an application program to control a plurality of hardware or software components connected thereto and may process and compute a variety of data. The processor 1610 may be implemented with, for example, a system on chip (SoC). According to an embodiment, the processor 1610 may include a graphic processing unit (GPU) (not shown) and/or an image signal processor (not shown). The processor 1610 may include at least some (e.g., a cellular module 1621) of the components shown in FIG. 16. The processor 1610 may load a command or data received from at least one of other components (e.g., a non-volatile memory) into a volatile memory to process the data and may store various data in a non-volatile memory.

The communication module 1620 may have the same or similar configuration to a communication interface 120 of FIG. 1. The communication module 1620 may include, for example, the cellular module 1621, a Wi-Fi module 1622, a BT module 1623, a GNSS module 1624 (e.g., a GPS module, a Glonass module, a Beidou module, or a Galileo module), a NFC module 1625, an MST module 1626, and a radio frequency (RF) module 1627.

The cellular module 1621 may provide, for example, a voice call service, a video call service, a text message service, or an Internet service, and the like through a communication network. According to an embodiment, the cellular module 1621 may identify and authenticate the electronic device 1601 in a communication network using the SIM 1629 (e.g., a SIM card). According to an embodiment, the cellular module 1621 may perform at least part of functions which may be provided by the processor 1610. According to an embodiment, the cellular module 1621 may include a CP.

The Wi-Fi module 1622, the BT module 1623, the GNSS module 1624, the NFC module 1625, or the MST module 1626 may include, for example, a processor for processing data transmitted and received through the corresponding module. According to various embodiments, at least some (e.g., two or more) of the cellular module 1621, the Wi-Fi module 1622, the BT module 1623, the GNSS module 1624, the NFC module 1625, or the MST module 1626 may be included in one integrated chip (IC) or one IC package.

The RF module 1627 may transmit and receive, for example, a communication signal (e.g., an RF signal). Though not shown, the RF module 1627 may include, for example, a transceiver, a power amplifier module (PAM), a frequency filter, or a low noise amplifier (LNA), or an antenna, and the like. According to another embodiment, at least one of the cellular module 1621, the Wi-Fi module 1622, the BT module 1623, the GNSS module 1624, the NFC module 1625, or the MST module 1626 may transmit and receive an RF signal through a separate RF module.

The SIM 1629 may include, for example, a card which includes a SIM and/or an embedded SIM. The SIM 1629 may include unique identification information (e.g., an integrated circuit card identifier (ICCID)) or subscriber information (e.g., an international mobile subscriber identity (IMSI)).

The memory 1630 may include, for example, an embedded memory 1632 or an external memory 1634. The embedded memory 1632 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1634 may include a flash drive, for example, a compact flash (CF), a secure digital (SD), a micro-SD, a mini-SD, an extreme digital (xD), a multimedia car (MMC), or a memory stick, and the like. The external memory 1634 may operatively and/or physically connect with the electronic device 1601 through various interfaces.

The secure module 1636 (or a secure memory) (e.g., a memory 110 of FIG. 1) may be a module which has a relatively higher secure level than the memory 1630 and may be a circuit which stores secure data and guarantees a protected execution environment. The secure module 1636 may be implemented with a separate circuit and may include a separate processor. The secure module 1636 may include, for example, an embedded secure element (eSE) which is present in a removable smart chip or a removable SD card or is embedded in a fixed chip of the electronic device 1601. Also, the secure module 1636 may be driven by an OS different from the OS of the electronic device 1601. For example, the secure module 1636 may operate based on a java card open platform (JCOP) OS. The sensor module 1640 may measure, for example, a physical quantity or may detect an operation state of the electronic device 1601, and may convert the measured or detected information to an electric signal. The sensor module 1640 may include at least one of, for example, a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color or RGB sensor 1640H (e.g., red, green, blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1640 may further include a control circuit for controlling at least one or more sensors included therein. According to various embodiments, the electronic device 1601 may further include a processor configured to control the sensor module 1640, as part of the processor 1610 or to be independent of the processor 1610. While the processor 1610 is in a sleep state, the electronic device 1601 may control the sensor module 1640.

The input device 1650 may include, for example, a touch panel 1652, a pen sensor 1654 (e.g., a digital pen sensor), a key 1656, or an ultrasonic input unit 1658. The touch panel 1652 may use at least one of, for example, a capacitive type, a resistive type, an infrared type, or an ultrasonic type. Also, the touch panel 1652 may further include a control circuit. The touch panel 1652 may further include a tactile layer and may provide a tactile reaction to a user.

The pen sensor 1654 may be, for example, part of the touch panel 1652 or may include a separate sheet for recognition. The key 1656 may include, for example, a physical button, an optical key, or a keypad. The ultrasonic input unit 1658 may allow the electronic device 1601 to detect a sound wave by using a microphone (MIC) 1688 and to verify data through an input tool generating an ultrasonic signal.

The display 1660 may include a panel 1662, a hologram device 1664, or a projector 1666. The panel 1662 may be implemented to be, for example, flexible, transparent, or wearable. The panel 1662 and the touch panel 1652 may be integrated into one module. The hologram device 1664 may show a stereoscopic image in a space using interference of light. The projector 1666 may project light onto a screen to display an image. The screen may be positioned, for example, inside or outside the electronic device 1601. According to an embodiment, the display 1660 may further include a control circuit for controlling the panel 1662, the hologram device 1664, or the projector 1666.

The interface 1670 may include, for example, a HDMI 1672, a USB 1674, an optical interface 1676, or a D-subminiature 1678. The interface 1670 may be included in, for example, a communication interface 1570 shown in FIG. 15. Additionally or alternatively, the interface 1670 may include, for example, a mobile high definition link (MHL) interface, an SD card/multimedia card (MMC) interface, or an infrared data association (IrDA) standard interface.

The audio module 1680 may convert a sound and an electric signal in dual directions. At least some of components of the audio module 1680 may be included in, for example, an input and output interface 1550 shown in FIG. 15. The audio module 1680 may process sound information input or output through, for example, a speaker 1682, a receiver 1684, an earphone 1686, or the microphone 1688, and the like.

The camera module 1691 may be a device which captures a still image and a moving image. According to an embodiment, the camera module 1691 may include one or more image sensors (such as a front sensor or a rear sensor (not shown)), a lens (not shown), an image signal processor (ISP) (not shown), or a flash (e.g., an LED or a Xenon lamp (not shown)).

The power management module 1695 may manage, for example, power of the electronic device 1601. According to an embodiment, though not shown, the power management module 1695 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1696 and voltage, current, or temperature thereof while the battery 1696 is charged. The battery 1696 may include, for example, a rechargeable battery or a solar battery.

The indicator 1697 may display a specific state of the electronic device 1601 or part (e.g., the processor 1610) thereof, for example, a booting state, a message state, or a charging state, and the like. The motor 1698 may convert an electric signal into mechanical vibration and may generate vibration or a haptic effect, and the like. Though not shown, the electronic device 1601 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFlo™ standard, and the like.

Figure 17:
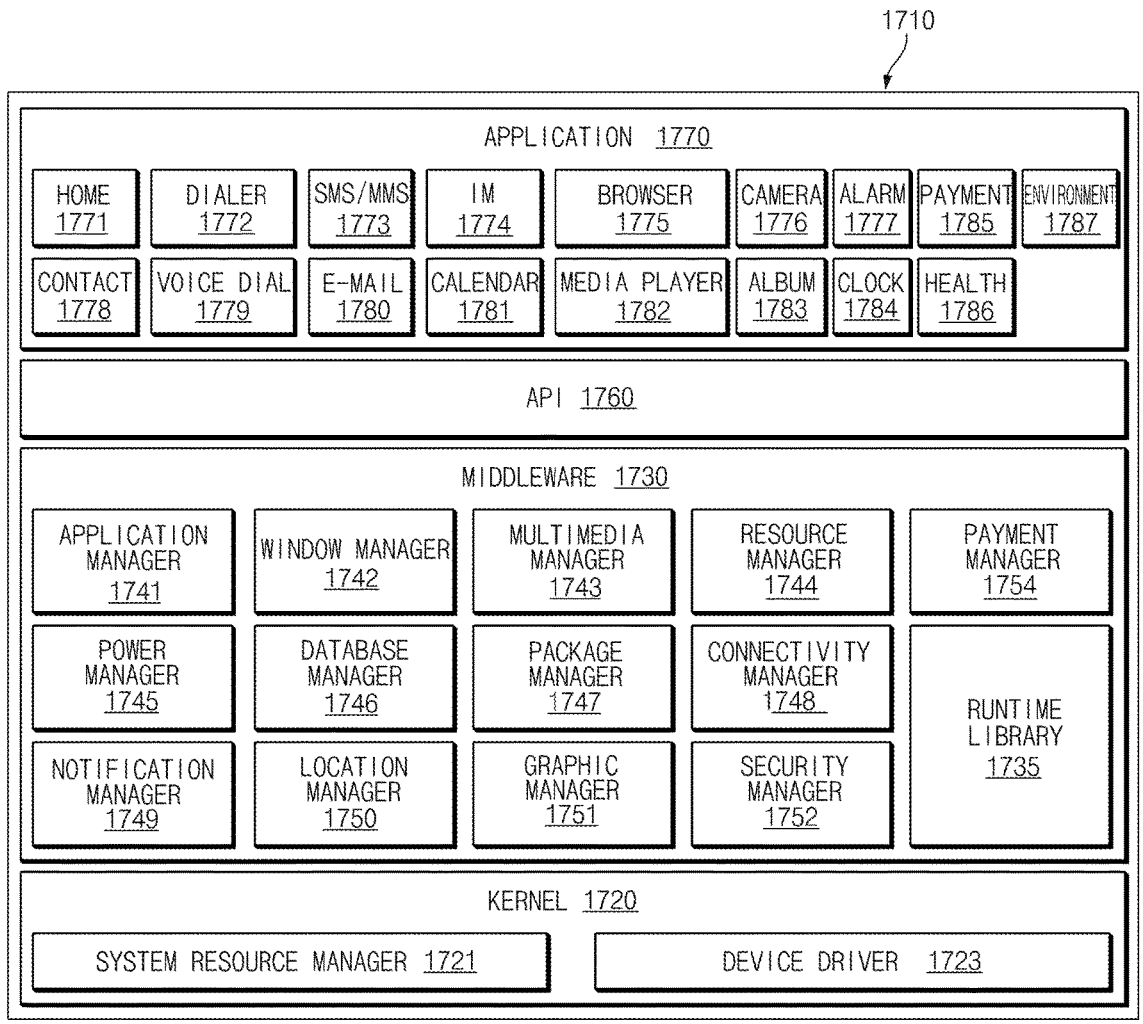
FIG. 17 is a block diagram illustrating a configuration of a program module according to various embodiments of the present disclosure.

FIG. 17 is a block diagram illustrating a configuration of a program module 310 according to various embodiments.

According to an embodiment, the program module 1710 (e.g., a program 1540 of FIG. 15) may include an operating system (OS) for controlling resources associated with an electronic device (e.g., an electronic device 1501 of FIG. 15) and/or various applications (e.g., an application program 1547 of FIG. 15) which are executed on the OS. The OS may be, for example, Android™, iOS™, Windows™, Symbian™, Tizen™, or Bada™, and the like.

The program module 1710 may include a kernel 1720, a middleware 1730, an API 1760, and/or at least one application 1770. At least part of the program module 1710 may be preloaded on the electronic device, or may be downloaded from an external electronic device (e.g., a first external electronic device 1502, a second external electronic device 1504, or a server 1506, and the like of FIG. 15).

The kernel 1720 (e.g., a kernel 1541 of FIG. 15) may include, for example, a system resource manager 1721 and/or a device driver 1723. The system resource manager 1721 may control, assign, or collect, and the like system resources. According to an embodiment, the system resource manager 1721 may include a process management unit, a memory management unit, or a file system management unit, and the like. The device driver 1723 may include, for example, a display driver, a camera driver, a BT driver, a shared memory driver, a USB driver, a keypad driver, a Wi-Fi driver, an audio driver, or an inter-process communication (IPC) driver.

The middleware 1730 (e.g., a middleware 1543 of FIG. 15) may provide, for example, functions the application 1770 needs in common, and may provide various functions to the application 1770 through the API 1760 such that the application 1770 efficiently uses limited system resources in the electronic device. According to an embodiment, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, a payment manager 1754, or any combination thereof.

The runtime library 1735 may include, for example, a library module used by a compiler to add a new function through a programming language while the application 1770 is executed. The runtime library 1735 may perform a function about input and output management, memory management, or an arithmetic function.

The application manager 1741 may manage, for example, a life cycle of at least one of the at least one application 1770. The window manager 1742 may manage graphic user interface (GUI) resources used on a screen of the electronic device. The multimedia manager 1743 may determine a format necessary for reproducing various media files and may encode or decode a media file using a codec corresponding to the corresponding format. The resource manager 1744 may manage source codes of at least one of the at least one application 1770, and may manage resources of a memory or a storage space, and the like.

The power manager 1745 may act together with, for example, a basic input/output system (BIOS) and the like, may manage a battery or a power source, and may provide power information necessary for an operation of the electronic device. The database manager 1746 may generate, search, or change a database to be used in at least one of the at least one application 1770. The package manager 1747 may manage installation or update of an application distributed by a type of a package file.

The connectivity manager 1748 may manage, for example, wireless connection such as Wi-Fi connection or BT connection, and the like. The notification manager 1749 may display or notify events, such as an arrival message, an appointment, and proximity notification, by a method which is not disturbed to the user. The location manager 1750 may manage location information of the electronic device. The graphic manager 1751 may manage a graphic effect to be provided to the user or a user interface (UI) related to the graphic effect. The security manager 1752 may provide all security functions necessary for system security or user authentication, and the like. According to an embodiment, when the electronic device (e.g., the electronic device 1501) has a phone function, the middleware 1730 may further include a telephony manager (not shown) for managing a voice or video communication function of the electronic device.

The middleware 1730 may include a middleware module which configures combinations of various functions of the above-described components. The middleware 1730 may provide a module which specializes according to kinds of OSs to provide a differentiated function. Also, the middleware 1730 may dynamically delete some of old components or may add new components.

The API 1760 (e.g., an API 1545 of FIG. 15) may be, for example, a set of API programming functions, and may be provided with different components according to OSs. For example, in case of Android or iOS, one API set may be provided according to platforms. In case of Tizen, two or more API sets may be provided according to platforms.

The at least one application 1770 (e.g., an application program 1547 of FIG. 15) may include one or more of, for example, a home application (HOME) 1771, a dialer application (DIALER) 1772, a short message service/multimedia message service (SMS/MMS) application 1773, an instant message (IM) application 1774, a browser application 1775, a camera application 1776, an alarm application 1777, a contact application 1778, a voice dial application 1779, an e-mail application 1780, a calendar application 1781, a media player application 1782, an album application 1783, a clock application 1784, a payment application 1785, a health care (HEALTH) application 1786 (e.g., an application for measuring quantity of exercise or blood sugar, and the like), or an environment information (ENVIRONMENT) application 1787 (e.g., an application for providing atmospheric pressure information, humidity information, or temperature information, and the like), and the like.

According to an embodiment, the application 1770 may include an application (hereinafter, for better understanding and ease of description, referred to as "information exchange application") for exchanging information between the electronic device (e.g., the electronic device 1501) and an external electronic device (e.g., the first external electronic device 1502 or the second external electronic device 1504). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1502 or the second external electronic device 1504). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1502 or the second external electronic device 1504) which communicates with the electronic device, an application which operates in the external electronic device, or a service (e.g., a call service or a message service) provided from the external electronic device.

According to an embodiment, the application 1770 may include an application (e.g., the health card application of a mobile medical device) which is preset according to attributes of the external electronic device (e.g., the first external electronic device 1502 or the second external electronic device 1504). According to an embodiment, the application 1770 may include an application received from the external electronic device (e.g., the server 1506, the first external electronic device 1502, or the second external electronic device 1504). According to an embodiment, the application 1770 may include a preloaded application or a third party application which may be downloaded from a server. Names of the components of the program module 1710 according to various embodiments of the present disclosure may differ according to kinds of OSs.

According to various embodiments, at least part of the program module 1710 may be implemented with software, firmware, hardware, or at least two or more combinations thereof. At least part of the program module 1710 may be implemented (e.g., executed) by, for example, a processor (e.g., a control module 150 of FIG. 1). At least part of the program module 1710 may include, for example, a module, a program, a routine, sets of instructions, or a process, and the like for performing one or more functions.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor (e.g., a control module 150 of FIG. 1), one or more processors may perform functions corresponding to the instructions.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

The computer-readable storage media may store a program for executing a method including executing an application program configured to store security information in a first secured region, receiving a request to store the security information from the application program, and storing the security information in a second secured region in response to the request.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments, the electronic device may manage functions associated with storing its security information in an integrated way and may manage the security information in a fluid way based on its situation.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:
1. An electronic device comprising:
a plurality of memories; and
a processor configured to electrically connect with the plurality of memories, wherein the processor is further configured to:
set a security level of each of the plurality of memories, differently,
execute an application program configured to store security information in a first secured region of one of the plurality of memories,
receive a request, from the application program, to store the security information in the first secured region of the one of the plurality of memories, and
select a memory of the plurality of memories based on the security level of the memory and store the security information in a second secured region of the memory, in response to the request.

2. The electronic device of claim 1, wherein the processor is further configured to:
receive information about the plurality of memories,
determine a different security level of each of the first secured region and the second secured region of the plurality of memories based on the information about the plurality of memories, and
determine the second secured region to store the security information based on the security level of the second secured region.

3. The electronic device of claim 2, wherein the information about the plurality of memories comprises:
at least one of memory identification information, secured region identification information, information indicating whether the plurality of memories are removable, information indicating whether the plurality of memories are hardware-independent memories, or information about a manufacturer of the plurality of memories.

4. The electronic device of claim 1, further comprising:
a transceiver,
wherein the processor is further configured to:
control the transceiver to transmit information of the plurality of memories to an external server,
control the transceiver to receive a security information management policy from the external server, and
select the second secured region to store the security information based on the security information management policy, and
wherein the security information management policy includes the security level of the second secured region which is higher than the security level of the first secured region.

5. The electronic device of claim 4, wherein the processor is further configured to determine the second secured region to store the security information, based on a second security information management policy, if the security information is not stored in the second secured region determined based on a first security information management policy.

6. The electronic device of claim 1, wherein the processor is further configured to determine the second secured region to store the security information, based on rights set to the application program which requests to store the security information.

7. The electronic device of claim 1, wherein the processor is further configured to determine the second secured region to store the security information, based on a category of the application program which requests to store the security information.

8. The electronic device of claim 1, wherein the processor is further configured to determine the second secured region to store the security information based on at least one of an area where the application program which requests to store the security information is installed, an identifier assigned to the application program, or a path of downloading the application program.

9. The electronic device of claim 1, further comprising:
a display configured to display one of a list of memories which store the security information among the plurality of memories or a list of security information stored in the plurality of memories.

10. The electronic device of claim 1, wherein the plurality of memories comprises:
a first memory configured to include the first secured region, and
a second memory configured to include the second secured region.

11. The electronic device of claim 1,
wherein the plurality of memories is configured to include a non-secured region for storing non-secured information, and
wherein the processor is able to access the non-secured region of the plurality of memories when the processor operates in at least a normal mode.

12. A method for storing security information in an electronic device, the method comprising:
setting a security level of each of a plurality of memories, differently;
executing an application program configured to store security information in a first secured region of one of the plurality of memories;
receiving a request, from the application program, to store the security information in the first secured region; and
selecting a memory of the plurality of memories based on the security level of the memory and storing the security information in a second secured region of the memory, in response to the request.

13. The method of claim 12, wherein the storing of the security information in the second secured region comprises:
obtaining information about the plurality of memories including a secured region, the plurality of memories being included in the electronic device;
determining a security level of each of the first secured region and the security level of the second secured region of the plurality of memories based on the information about the plurality of memories; and
determining the second secured region to store the security information, based on the security level of the second secured region.

14. The method of claim 13, wherein the information about the plurality of memories comprises:
at least one of memory identification information, secured region identification information, information indicating whether the plurality of memories are removable, information indicating whether the plurality of memories are hardware-independent memories, or information about a manufacturer of the plurality of memories.

15. The method of claim 12,
wherein the storing of the security information in the second secured region comprises:
transmitting information of the plurality of memories to an external server,
receiving a security information management policy from the external server, and
selecting the second secured region to store the security information based on the security information management policy, and wherein the security information management policy includes the security level of the second secured region being higher than the security level of the first secured region.

16. The method of claim 15, wherein the selecting of the second secured region to store the security information based on the security information management policy comprises:

determining the second secured region to store the security information, based on a first security information management policy; and determining the second secured region to store the security information, based on a second security information management policy, if the security information is not stored in the second secured region determined based on the first security information management policy.

17. The method of claim 12, wherein the storing of the security information in the second secured region comprises:

determining the second secured region to store the security information, based on rights set to the application program which requests to store the security information.

18. The method of claim 12, wherein the storing of the security information in the second secured region comprises:

determining the second secured region to store the security information, based on a category of the application program which requests to store the security information.

19. The method of claim 12, wherein the storing of the security information in the second secured region comprises:

determining the second secured region to store the security information, based on at least one of an area where the application program which requests to store the security information is installed, an identifier assigned to the application program, or a path of downloading the application program.

20. The method of claim 12, wherein the storing of the security information in the second secured region comprises:

storing the security information in the second secured region by at least a part of a framework which interfaces with the application program.

* * * * *